United States Patent
Nakatsuka et al.

(10) Patent No.: US 10,214,215 B2
(45) Date of Patent: Feb. 26, 2019

(54) EMERGENCY VEHICLE CONTROL DEVICE

(71) Applicant: HONDA MOTOR CO., LTD., Tokyo (JP)

(72) Inventors: Masayuki Nakatsuka, Wako (JP); Kei Oshida, Wako (JP); Makoto Katayama, Wako (JP); Yukinori Kurahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 15/205,258

(22) Filed: Jul. 8, 2016

(65) Prior Publication Data

US 2017/0008528 A1    Jan. 12, 2017

(30) Foreign Application Priority Data

Jul. 10, 2015    (JP) .................................. 2015-139006

(51) Int. Cl.
*B60W 30/18* (2012.01)
*H04W 4/90* (2018.01)

(52) U.S. Cl.
CPC ........ *B60W 30/18109* (2013.01); *H04W 4/90* (2018.02); *B60W 2540/10* (2013.01); *B60W 2540/26* (2013.01); *B60W 2720/10* (2013.01); *B60W 2900/00* (2013.01)

(58) Field of Classification Search
CPC ............................................ B60W 30/18109
See application file for complete search history.

(56) References Cited

U.S. PATENT DOCUMENTS

| 8,942,904 | B2 * | 1/2015 | Foerster | B60T 7/22 |
| | | | | 180/282 |
| 9,145,116 | B2 * | 9/2015 | Clarke | B60W 30/00 |
| 9,199,587 | B2 * | 12/2015 | Shiono | B60W 50/14 |
| 9,227,631 | B2 * | 1/2016 | Kammel | B60K 28/066 |
| 9,248,810 | B2 * | 2/2016 | Olofsson | B60T 7/042 |
| 2009/0248231 | A1 * | 10/2009 | Kamiya | G05D 1/0061 |
| | | | | 701/23 |
| 2016/0001781 | A1 * | 1/2016 | Fung | G06F 19/345 |
| | | | | 701/36 |

(Continued)

FOREIGN PATENT DOCUMENTS

JP        2012-228954 A    11/2012

*Primary Examiner* — Adam D Tissot
*Assistant Examiner* — Michael A Berns
(74) *Attorney, Agent, or Firm* — Westerman, Hattori, Daniels & Adrian, LLP

(57) ABSTRACT

An emergency vehicle control device, when an emergency vehicle stop switch is operated for an operation time threshold value or longer in a state where automatic vehicle stop control is not executed, determines that the automatic vehicle stop control is intended to be executed. Later, when the interval between the previous operation and the current operation of the emergency vehicle stop switch is within an operation interval threshold value, the determination that the automatic vehicle stop control is intended to be executed is sustained, whereas when the interval exceeds the operation interval threshold value and the emergency vehicle stop switch is operated for the operation time threshold value or longer, it is determined that the execution of the automatic vehicle stop control is intended to be cancelled.

6 Claims, 13 Drawing Sheets

(56) References Cited

U.S. PATENT DOCUMENTS

2016/0200317 A1* 7/2016 Danzl .................... B60K 28/06
                                                        701/25
2016/0288707 A1* 10/2016 Matsumura .............. B60Q 9/00
2016/0313730 A1* 10/2016 Ricci .................... G05D 1/0027
2017/0305440 A1* 10/2017 Oba ...................... B60W 50/14

* cited by examiner

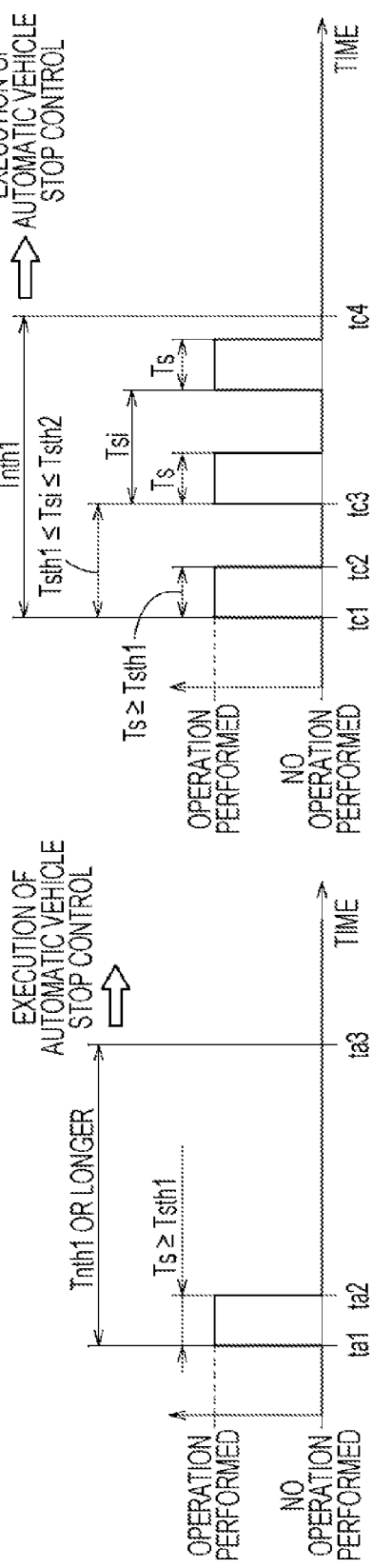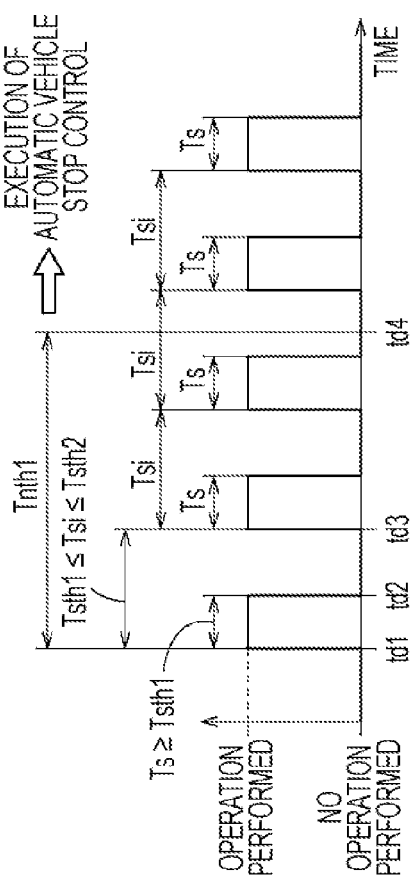

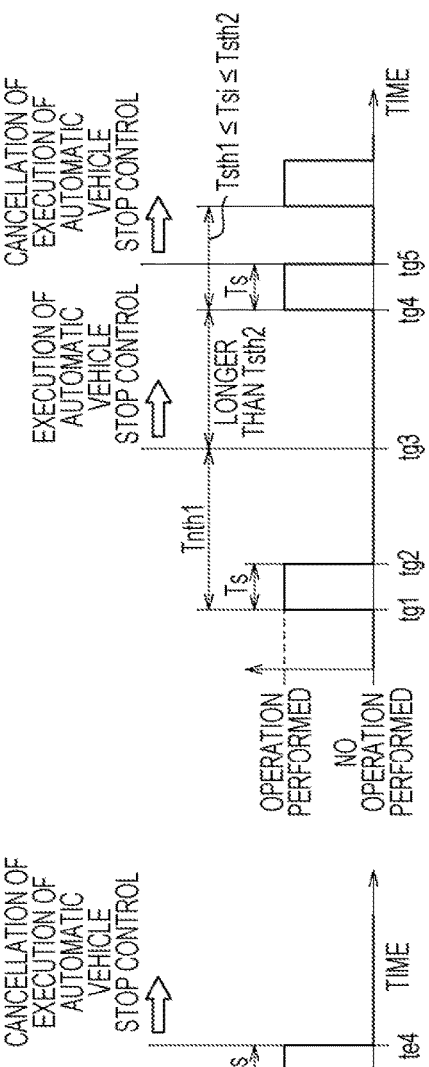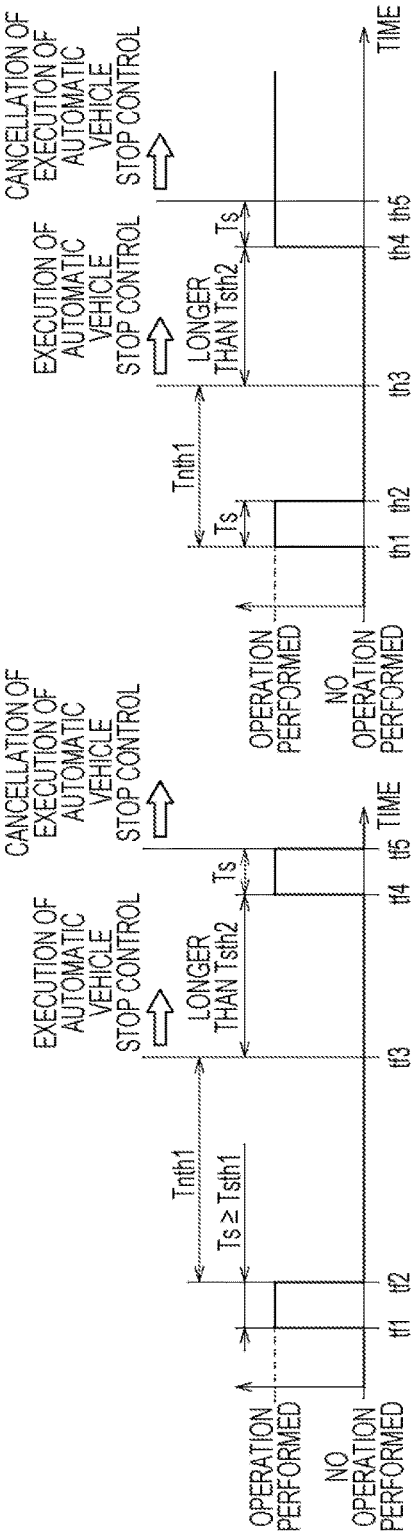

EMERGENCY VEHICLE CONTROL DEVICE

CROSS REFERENCES TO RELATED APPLICATIONS

The present application claims priority under 35 U.S.C. § 119 to Japanese Patent Application No. 2015-139006, filed Jul. 10, 2015, entitled "Emergency Vehicle Control Device." The contents of this application are incorporated herein by reference in their entirety.

BACKGROUND

1. Field

The present disclosure relates to an emergency vehicle control device that automatically stop a vehicle when an emergency situation occurs which makes it difficult for a driver to continue driving while the vehicle is running, and particularly relates to an emergency vehicle control device that performs automatic vehicle stop control by a switch operation.

2. Description of the Related Art

An emergency situation which makes it difficult for a driver to continue driving, for instance, illness of the driver may suddenly occur in the vehicle. To cope with such a situation, devices have been developed that, when it is difficult for the driver to continue driving, stops the vehicle automatically. In such devices, accidental activation of automatic vehicle stop control has to be avoided by appropriately determining that the driver is in a state that makes it difficult to continue driving. For instance, Japanese Unexamined Patent Application Publication No. 2012-228954 discloses a device that, when an emergency vehicle stop switch is operated, executes automatic vehicle stop control, and that, when an accelerator operation is performed, cancels the execution of the automatic vehicle stop control.

There are various types of switches. Among all, automatic return switches are widely used. In general, an automatic return switch outputs a switching signal from OFF to ON for the first operation, and outputs a switching signal from ON to OFF for the second operation. However, when an automatic return type is used for an emergency vehicle stop switch, the following problem arises. That is, in the case where the driver falls into a state that makes it difficult to continue driving, passengers may panic and may repeatedly press. When ON/OFF signals are outputted as the switch is repeatedly pressed, execution and cancellation of execution of the automatic vehicle stop control may not be performed properly.

SUMMARY

The present disclosure has been made in consideration of such a problem, and provides an emergency vehicle control device capable of executing automatic vehicle stop control appropriately even when an automatic return switch is repeatedly operated for a short time.

An emergency vehicle control device according to the present disclosure includes: an automatic return switch that is provided with a function of indicating an intention of an occupant regarding execution and cancellation of execution of automatic vehicle stop control over a vehicle which is running. When the switch is operated for a first predetermined time or longer in a state where the automatic vehicle stop control is not executed, it is determined that the automatic vehicle stop control is intended to be executed, and after it is determined that the automatic vehicle stop control is intended to be executed, when an interval between a previous operation and a current operation of the switch is within a second predetermined time which is longer than the first predetermined time, the determination that the automatic vehicle stop control is intended to be executed is sustained, whereas when the interval exceeds the second predetermined time and the switch is operated for the first predetermined time or longer, it is determined that the execution of the automatic vehicle stop control is intended to be cancelled. According to the present disclosure, when an automatic return switch is repeatedly operated for a short time after automatic vehicle stop control is intended to be executed, it is possible to reliably execute the automatic vehicle stop control provided that the interval between operations is within the second predetermined time.

In the present disclosure, in the case where the switch is operated in a state where it is determined that the execution of the automatic vehicle stop control is intended to be cancelled, when an interval between a previous operation and a current operation of the switch is within the second predetermined time, the determination that the execution of the automatic vehicle stop control is intended to be cancelled may be sustained, whereas when the interval exceeds the second predetermined time and the switch is operated for the first predetermined time or longer, it may be determined that the automatic vehicle stop control is intended to be executed. According to the present disclosure, when an automatic return switch is repeatedly operated for a short time after automatic vehicle stop control is intended to be cancelled, it is possible to reliably cancel the execution of the automatic vehicle stop control provided that the interval between operations is within the second predetermined time.

In the present disclosure, the emergency vehicle control device may further include a vehicle operation detector that detects a predetermined vehicle operation. In the case where it is determined by an operation of the switch during running of the vehicle that the automatic vehicle stop control is intended to be executed and the vehicle operation is detected by the vehicle operation detector, the vehicle may be automatically stopped. According to the present disclosure, automatic vehicle stop control is executed when a vehicle operation and a switch operation are in a specific state. Thus erroneous operation of the automatic vehicle stop control is avoidable.

In the present disclosure, when an accelerator operation is performed during execution of the automatic vehicle stop control, the automatic vehicle stop control may be temporarily stopped and the accelerator operation may be preferentially performed, and when the accelerator operation is continuously performed for a predetermined time or longer, the execution of the automatic vehicle stop control may be cancelled. According to the present disclosure, an accelerator operation is temporarily allowed during the automatic vehicle stop control, and thus an acceleration operation is temporarily allowed under the automatic vehicle stop control. When the driver wants to perform an accelerator operation while executing the automatic vehicle stop control like this, the authority to perform an accelerator operation may be transferred (overridden) to the driver. In addition, cancellation of the execution of the automatic vehicle stop control may be made by an accelerator operation.

In the present disclosure, the switch may be provided with a function other than the function of indicating an intention. For instance, the switch may be provided with a function of starting phone call to the outside of the vehicle. According to the present disclosure, a switch operation to cause the automatic vehicle stop control to be executed in case of an emergency, and a switch operation to start phone call to the outside of the vehicle in case of an emergency may be performed by a single operation. Thus, the load of an occupant on a switch operation is reduced.

According to the present disclosure, it is possible to easily and accurately estimate the driver's state that makes it difficult to continue driving and to execute automatic vehicle stop control.

BRIEF DESCRIPTION OF THE DRAWINGS

FIG. 4 is a flow chart of automatic vehicle stop determination processing with ACC/CC on.

FIGS. 12A to 12D are explanatory diagrams of patterns of switch operation performed when automatic vehicle stop control is executed.

FIGS. 13A to 13D are explanatory diagrams of patterns of switch operation performed when automatic vehicle stop control is cancelled.

DESCRIPTION OF THE PREFERRED EMBODIMENTS

A preferred embodiment of an emergency vehicle control device 10 according to the present disclosure will be described in detail below with reference to the accompanying drawings.

1. First Embodiment

[1-1. Configuration of Emergency Vehicle Control Device 10]

Figure 1:
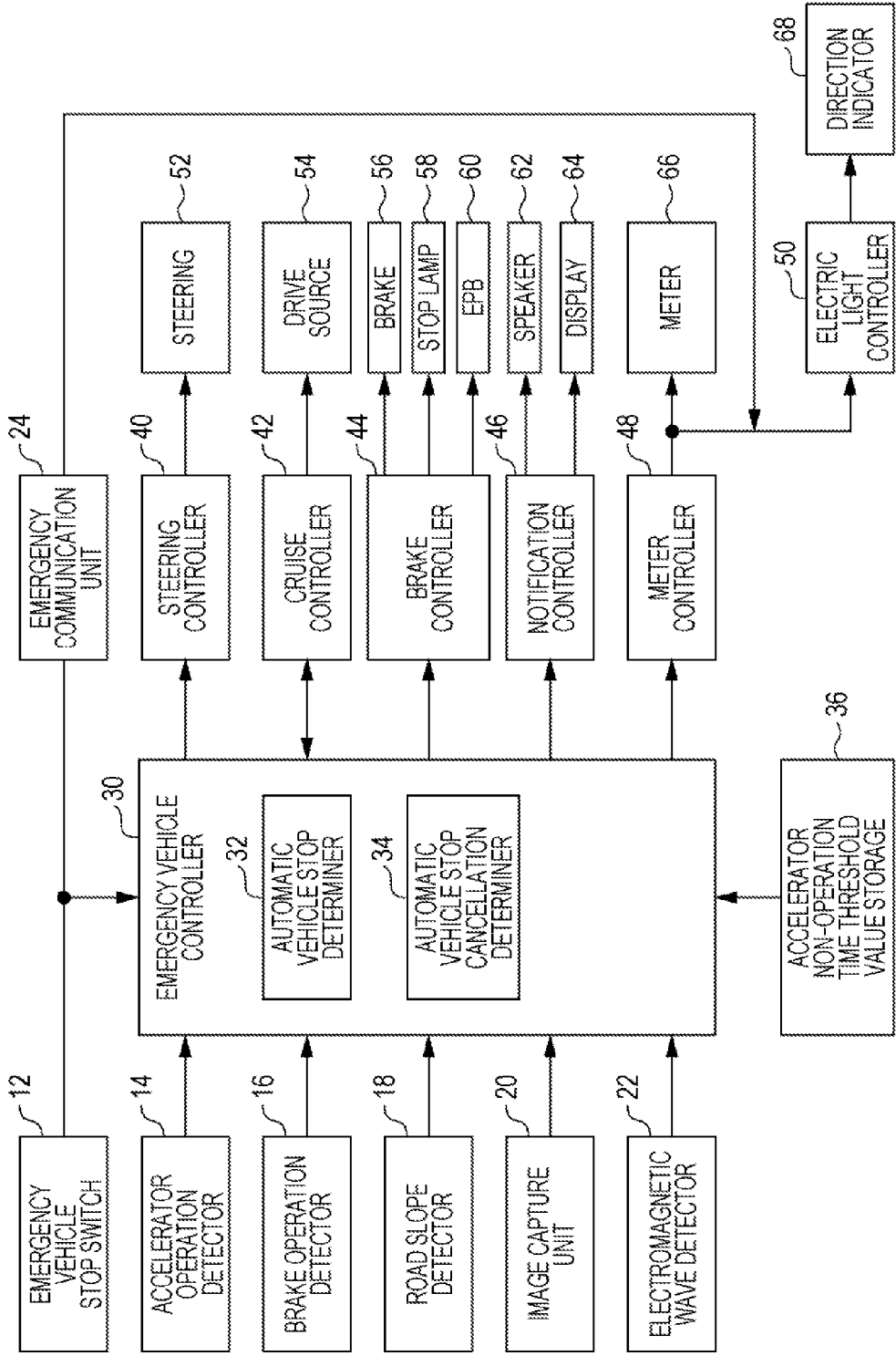
FIG. 1 is a functional block diagram of an emergency vehicle control device according to first and second embodiments.

The configuration of the emergency vehicle control device 10 will be described with reference to FIG. 1. The emergency vehicle control device 10 has various information input units (12, 14, 16, 18, 20, 22), various controllers (30, 40, 42, 44, 46, 48, 50), and various controlled units (52, 54, 56, 58, 60, 62, 64, 66, 68). In addition, the emergency vehicle control device 10 has an emergency communication unit 24 that makes an emergency call.

[1-1-1. Input Unit of Emergency Vehicle Control Device 10]

The emergency vehicle stop switch 12 is an automatic return switch (momentary switch) installed in a vehicle cabin. The type of the emergency vehicle stop switch 12 may be any type including a push type, a lever type, and a rotary type. The installation location of the emergency vehicle stop switch 12 may be any location in the vehicle cabin, but is preferably a location accessible by all occupants (the driver and the passengers), for instance, the roof, and may be a location accessible by the occupants on the driver seat and the front passenger seat, for instance, the dashboard. Since the emergency vehicle stop switch 12 is an automatic return switch, an ON signal is outputted during operation. In the present embodiment, when an operation time Ts of the emergency vehicle stop switch 12, that is, an output time of an ON signal continues for an operation time threshold value Tsth1 (units of $1/100$ second) or longer, the operation of the emergency vehicle stop switch 12 is considered to be effective. The operation of the emergency vehicle stop switch 12 will be explained in the later-described [1-5. Relationship between Operation of Emergency Vehicle Stop Switch 12 and Execution of Automatic Vehicle Stop Control].

The emergency vehicle stop switch 12 is provided with a function of indicating an intention of an occupant, regarding execution and cancellation of execution of automatic vehicle stop control of a vehicle at the occurrence of an emergency situation. As described later, in response to an operation of the emergency vehicle stop switch 12, an ON signal is outputted to an emergency vehicle controller 30, and automatic vehicle stop control is executed or execution of automatic vehicle stop control is cancelled. In addition, the emergency vehicle stop switch 12 is provided with a function of starting phone call to the outside of the vehicle. Specifically, in response to an operation of the emergency vehicle stop switch 12, an ON signal is outputted to the emergency communication unit 24, which allows a phone call to an operator of an external organization (emergency lifesaving center) in a remote place.

An accelerator operation detector 14 detects whether or not an accelerator pedal is being operated. The accelerator operation detector 14 may detect the amount of operation itself of the accelerator pedal like a stroke sensor, for instance, or may detect an electrical signal generated in a drive-by-wire.

A brake operation detector 16 detects whether or not a brake pedal and/or a brake lever (including a parking brake) are being operated. The brake operation detector 16 may detect the amount of operation itself of the brake pedal and/or the brake lever like a stroke sensor, for instance, or may detect an electrical signal generated in a brake-by-wire.

A road slope detector 18 detects an angle of inclination of the road on which the vehicle runs. The angle of inclination is determined by measuring the angle of inclination (the angle of inclination in a fore-and-aft direction) of the vehicle itself using like a tilt sensor, for instance. It is also possible to identify the location of the self-vehicle utilizing a positioning device like a GPS and to determine the angle of inclination of the location of the self-vehicle based on map information.

An image capture unit 20 includes a camera such as a monocular camera or a stereo camera. The camera is installed, for instance, in an upper portion of the inner side of the front window in the vehicle cabin. The camera captures an image of the road environment (a lane mark, a three-dimensional object) ahead of the vehicle, and obtains image information.

An electromagnetic wave detector 22 includes a radar such as a millimeter-wave radar, a microwave radar, a laser radar and/or an infrared sensor (hereinafter collectively referred to as radars). The radars are installed in the front grille, for instance. The radars emit electromagnetic waves to the road environment ahead of the vehicle and obtain position information on a reflection wave reflected by a three-dimensional object.

[1-1-2. Emergency Communication Unit 24]

The emergency communication unit 24 has a communication terminal in the vehicle cabin, and a connecting device that connects the communication terminal via a dedicated line or a public line to a communication terminal of an external organization, that is, an emergency lifesaving center in the present embodiment. In response to input of an ON signal which is outputted in response to an operation of the emergency vehicle stop switch 12, the emergency communication unit 24 establishes a communication line between the communication terminal of the vehicle cabin and the communication terminal of the emergency lifesaving center.

[1-1-3. Controller of Emergency Vehicle Control Device 10]

The emergency vehicle controller 30 is formed of an ECU. The ECU is a computer including a microcomputer and includes a central processing unit (CPU), a ROM (including an EEPROM), a random access memory (RAM), and input/output devices such as an A/D converter, a D/A converter. The CPU reads and executes a program recorded on the ROM, and the ECU thereby serving as one of various function achieving units, for instance, a controller, a calculation unit, and a processing unit. In the present embodiment, the ECU included in the emergency vehicle controller 30 executes a program, thereby serving as an automatic vehicle stop determiner 32 and an automatic vehicle stop cancellation determiner 34. The ECU may be divided into multiple units or may be integrated with other ECUs. It is to be noted that the emergency vehicle controller 30 in the present embodiment is achieved utilizing a fusion ECU that combines pieces of information of the image capture unit 20 and the electromagnetic wave detector 22.

The automatic vehicle stop determiner 32 is configured to determine whether a driver is in a state that makes it difficult to continue driving, and to determine necessity of execution of automatic vehicle stop control according to the present embodiment. The automatic vehicle stop cancellation determiner 34 is configured to determine necessity of cancellation of the automatic vehicle stop control during the execution of the automatic vehicle stop control according to the present embodiment. The details of the processing performed by the automatic vehicle stop determiner 32 and the automatic vehicle stop cancellation determiner 34 will be explained in the later-described [1-2. Processing of Emergency Vehicle Control Device 10]. An accelerator non-operation time threshold storage 36 stores a threshold value of an accelerator non-operation time corresponding to a road slope.

A steering controller 40 is also formed of an ECU, which serves as any of various function achieving units by executing a corresponding program. The steering controller 40 performs lane keeping control and road departure mitigation control based on a steering angle obtained by a steering angle sensor which is not illustrated, and lane mark information obtained by the image capture unit 20. Specifically, the steering controller 40 calculates an appropriate amount of steering in order to maintain the distance between the self-vehicle and a lane mark within a predetermined range, based on the lane mark information obtained by the image capture unit 20. The steering controller 40 then commands a steering 52 to steer. In addition, when the distance between a lane mark and the self-vehicle decreases, the steering controller 40 commands the steering 52 to perform a warning operation. Hereinafter, lane keeping control and road departure mitigation control are collectively referred to as lane keeping control and others.

A cruise controller 42 is also formed of an ECU, which serves as any of various function achieving units by executing a corresponding program. In response to an ON operation of a switch (not illustrated) provided in the vehicle cabin, the cruise controller 42 executes inter-vehicle maintaining control and/or vehicle speed maintaining control. Hereinafter, inter-vehicle maintaining control is referred to as adaptive cruise control (ACC) and vehicle speed maintaining control is referred to as cruise control (CC). The cruise controller 42 calculates appropriate accelerator operation amount and brake operation amount in order to maintain the distance between the self-vehicle and the vehicle running ahead, based on the information on the distance to the vehicle running ahead obtained by the electromagnetic wave detector 22. The cruise controller 42 then commands a drive source 54 to perform an accelerator operation and commands the brake controller 44 to perform automatic deceleration operation.

The brake controller 44 is also formed of an ECU, which serves as any of various function achieving units by executing a corresponding program. The brake controller 44 performs automatic deceleration control to allow the vehicle to be stopped in a stable manner, based on a steering angle, a yaw rate, an acceleration/deceleration, a wheel speed obtained by a steering angle sensor, a yaw rate sensor, an acceleration sensor, a wheel speed sensor which are not illustrated. The brake controller 44 determines an optimal brake pressure for each wheel according to an automatic deceleration command outputted from the emergency vehicle controller 30 or the cruise controller 42. The brake controller 44 then commands a brake 56 to perform a brake operation and commands a stop lamp 58 to turn on light. In addition, when the vehicle is stopped by the automatic deceleration control, the brake controller 44 commands EPS 60 to keep the vehicle stopped.

Similarly to the emergency vehicle controller 30, a notification controller 46 is also formed of an ECU, which serves as any of various function achieving units by executing a corresponding program. The notification controller 46 commands a speaker 62 to provide voice guidance, and commands a display 64 to display the state of the emergency vehicle control device 10.

A meter controller 48 is also formed of an ECU, which serves as any of various function achieving units by executing a corresponding program. When the automatic vehicle stop control is executed, the meter controller 48 commands a meter 66 and an electric light controller 50 to blink a hazard lamp.

The electric light controller 50 is also formed of an ECU, which serves as any of various function achieving units by executing a corresponding program. In response to a command to blink the hazard lamp outputted from the meter controller 48, the electric light controller 50 commands each direction indicator 68 on the right and left to blink.

[1-1-4. Controlled Units of Emergency Vehicle Control Device 10]

The steering 52 has an electric power steering mechanism that assists steering by an operation of an electric motor. The electric motor operates in accordance with a command for steering outputted from the steering controller 40.

The drive source 54 is equipped with a drive mechanism including at least one of an electric motor for cruise and an engine. The electric motor for cruise operates in accordance with a command for an accelerator operation outputted from the cruise controller 42. Also, an intake pipe of the engine is provided with a throttle valve which operates in accordance with a command for an accelerator operation outputted from the cruise controller 42.

The brake 56 includes a brake mechanism which is driven by a hydraulic pressure. A hydraulic circuit of the brake mechanism is provided with a brake actuator such as an electromagnetic valve, and the brake actuator operates in accordance with a command for a brake operation outputted from the brake controller 44. Appropriate brake fluid for brake pistons of each wheel is supplied by the operation of the brake actuator. The stop lamp 58 lights on in accordance with a command for light-on outputted from the brake controller 44. EPB (electric parking brake) 60 includes a parking brake mechanism that keeps the vehicle stopped by the operation of an electric motor. The electric motor operates in accordance with a command for keeping the vehicle stopped outputted from the brake controller 44.

The speaker 62 provides predetermined voice guidance in accordance with a command for the voice guidance outputted from the notification controller 46. The display 64 displays a state in accordance with a command for state display of the emergency vehicle control device 10 outputted from the notification controller 46.

The meter 66 blinks a hazard lamp in a meter in accordance with a command for blinking the hazard lamp outputted from the meter controller 48. Each direction indicator 68 blinks in accordance with a command for blinking the hazard lamp outputted from the electric light controller 50.

[1-2. Processing of Emergency Vehicle Control Device 10]

The emergency vehicle control processing in the emergency vehicle control device 10 will be described with reference to FIG. 1 and FIGS. 2 to 5. It is to be noted that the following processing is repeatedly performed for every predetermined time, for instance, for every millisecond.

[1-2-1. Overall Flow of Emergency Vehicle Control Processing]

Figure 2:
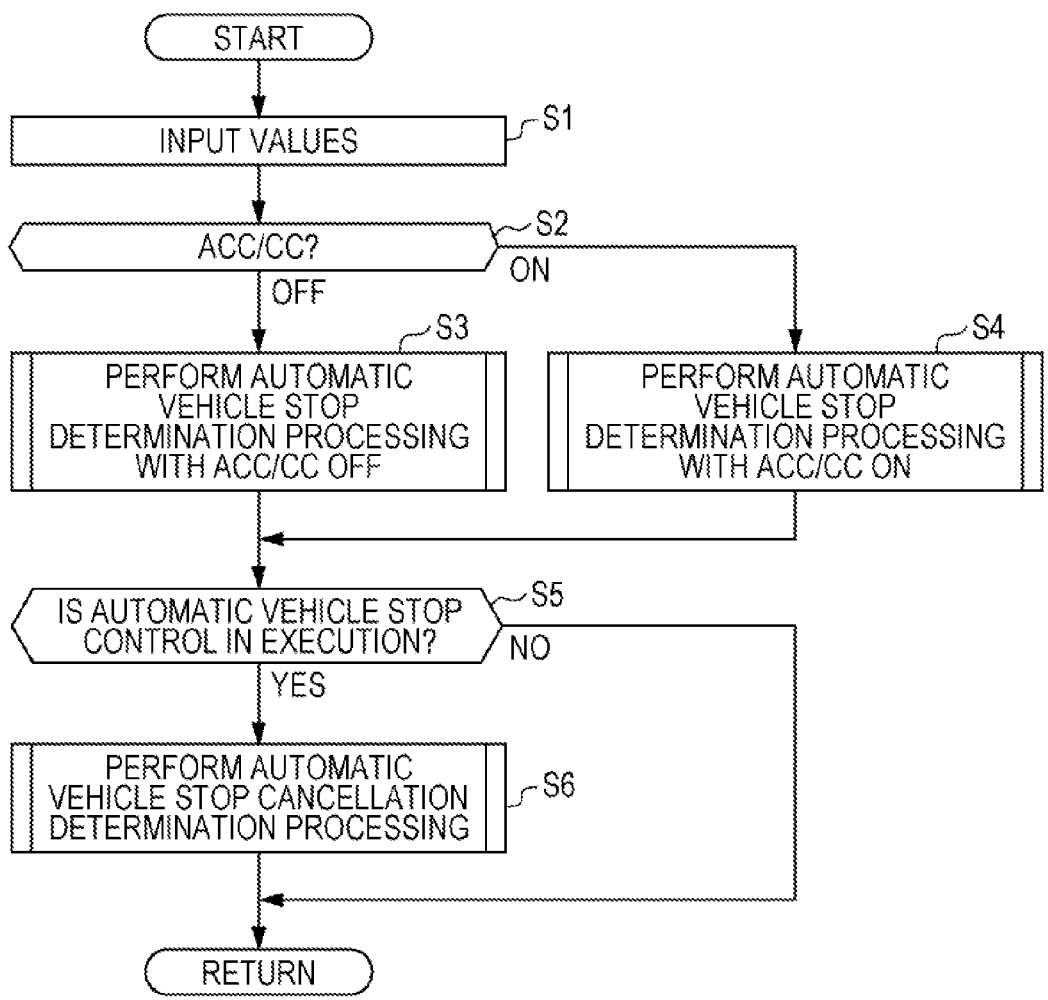
FIG. 2 is a flow chart of emergency vehicle control processing.

The basic flow of emergency vehicle control processing will be described with reference to FIG. 2. In step S1, each of the output values of the sensors (the input units 14, 16, 18, 20, 22 of the emergency vehicle control device 10) is inputted to the emergency vehicle controlled 30. Each of the output values of a steering angle sensor, a yaw rate sensor, an acceleration sensor, a wheel speed sensor which are not illustrated is inputted to the steering controller 40 and the brake controller 44. Each output value is outputted and inputted all the time.

In step S2, the emergency vehicle controller 30 determines whether ACC/CC of the vehicle is in an OFF state or an ON state. For instance, it is determined whether or not the cruise controller 42 is executing ACC/CC. When ACC/CC is in an OFF state (OFF in step S2), the flow proceeds to step S3. When ACC/CC is in an ON state (ON in step S2), the flow proceeds to step S4.

Figure 3:
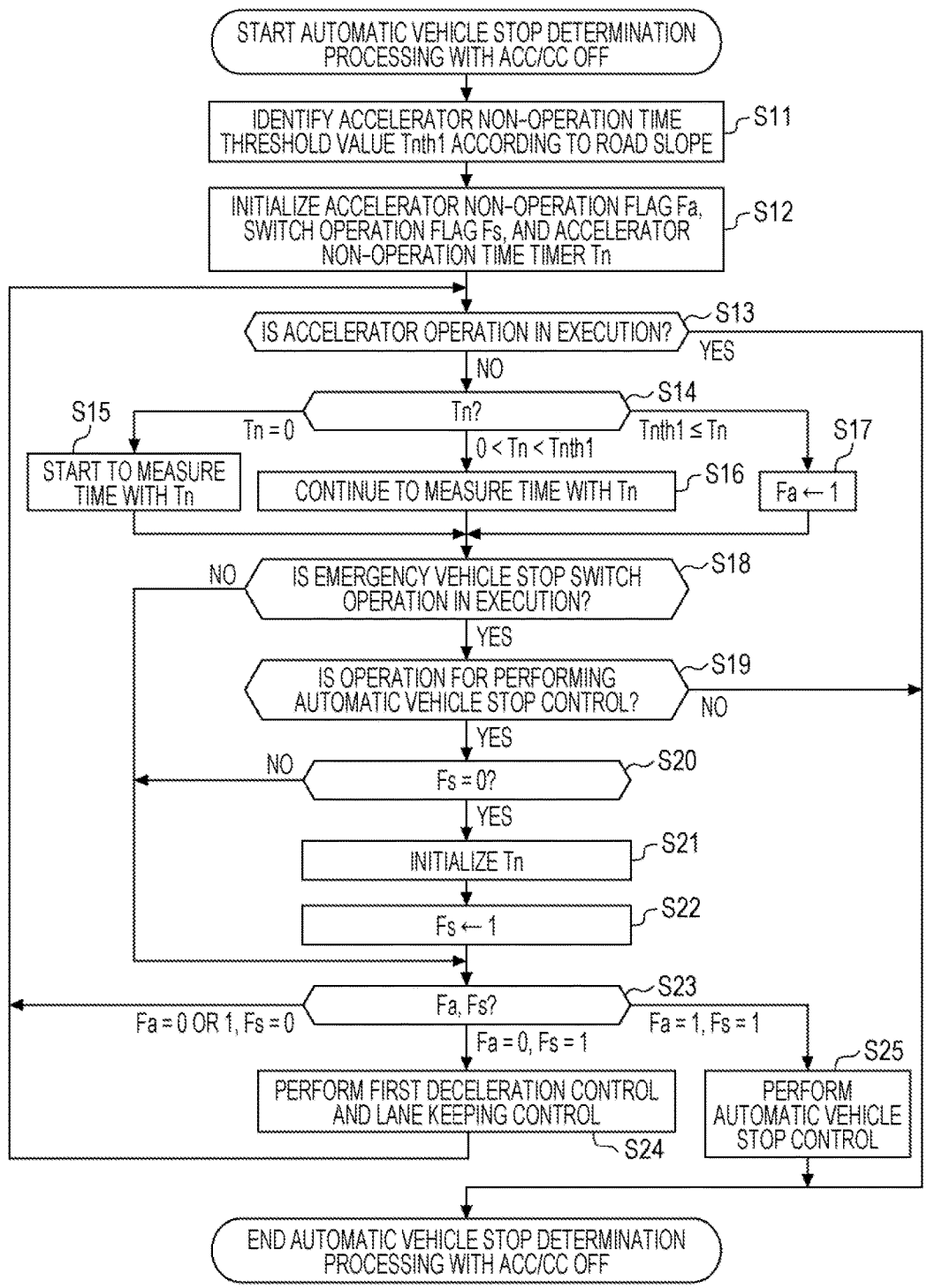
FIG. 3 is a flow chart of automatic vehicle stop determination processing with ACC/CC off.

In step S3, automatic vehicle stop determination processing with ACC/CC OFF is performed, which is described with reference to FIG. 3. In step S4, automatic vehicle stop determination processing with ACC/CC ON is performed, which is described with reference to FIG. 4. In step S3 and step S4, it is determined whether or not the driver is in a state that makes it difficult to continue driving, and when the driver is in such a state, automatic vehicle stop control is executed.

In step S5, the emergency vehicle controller 30 determines whether or not automatic vehicle stop control processing is in execution. When the automatic vehicle stop control processing is in execution (YES in step S5), the flow proceeds to step S6. When the automatic vehicle stop control processing is not in execution (NO in step S5), the flow returns to the start and the processing in and after S1 is repeated.

Figure 5:
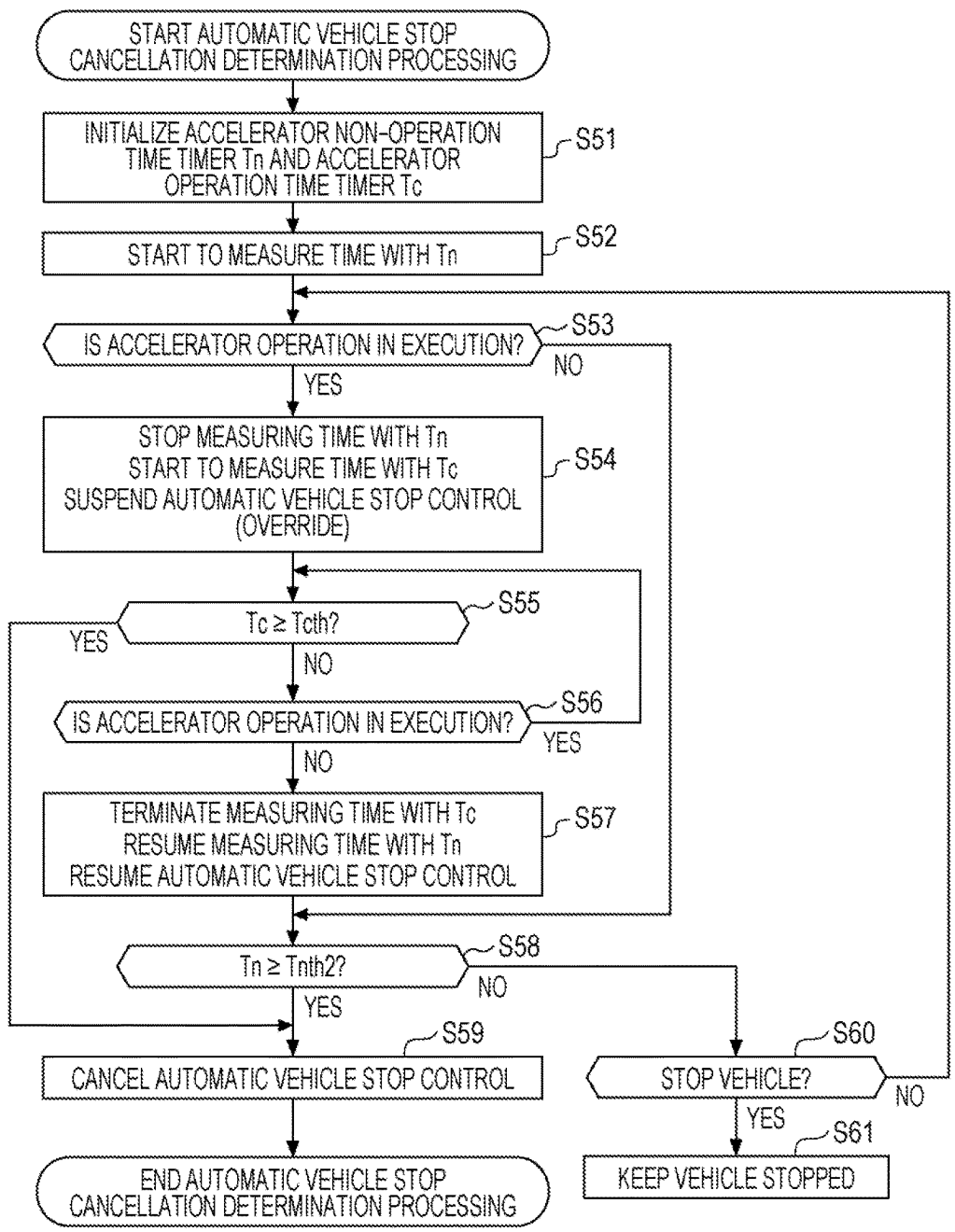
FIG. 5 is a flow chart of automatic vehicle stop cancellation determination processing.

In step S6, automatic vehicle stop cancellation determination processing is performed, which is described with reference to FIG. 5. In step S6, it is determined whether or not an occupant intends to cancel the automatic vehicle stop control processing. When an occupant intends to cancel, cancellation of the automatic vehicle stop control processing is executed. When an occupant does not intend to cancel, the vehicle is decelerated then stopped.

[1-2-2. Automatic Vehicle Stop Determination Processing with ACC/CC OFF]

The flow of automatic vehicle stop determination processing with ACC/CC OFF will be described with reference to FIG. 3. In step S11, the automatic vehicle stop determiner 32 identifies an accelerator non-operation time threshold value Tnth1 according to a road slope. In the present embodiment, as a technique to determine whether the driver is in a state that makes it difficult to continue driving, it is determined whether an accelerator non-operation time is long or short. The accelerator non-operation time tends to change according to a road slope. For instance, when the uphill road slope is high and the accelerator non-operation time is long, the vehicle is decelerated more than needed. Thus, when the uphill road slope is high, the accelerator non-operation time tends to be short. Also, when the downhill road slope is high and the accelerator non-operation time is short (an accelerator operation is performed), the vehicle is accelerated more than needed. Thus, when the downhill road slope is high, the accelerator non-operation time tends to be long. The automatic vehicle stop determiner 32 obtains an accelerator non-operation time threshold value Tnth1 according to a road slope from the accelerator non-operation time threshold storage 36, the road slope being obtained by the road slope detector 18. Higher the uphill road slope, shorter the accelerator non-operation time threshold value Tnth1, and higher the downhill road slope, longer the accelerator non-operation time threshold value Tnth1.

In step S12, the automatic vehicle stop determiner 32 initializes an accelerator non-operation flag Fa, a switch operation flag Fs, and an accelerator non-operation time timer Tn. The accelerator non-operation flag Fa is a flag for determining whether or not an accelerator state is in an accelerator non-operation state lasting for the accelerator non-operation time threshold value Tnth1 or longer. The switch operation flag Fs is a flag for determining whether or not an operation of the emergency vehicle stop switch 12 is performed. The accelerator non-operation time timer Tn is a timer that measures an accelerator non-operation time.

In step S13, the automatic vehicle stop determiner 32 determines whether or not an accelerator operation is performed, based on the output of the accelerator operation detector 14. When no accelerator operation is performed (NO in step S13), the flow proceeds to step S14. When an accelerator operation is performed (YES in step S13), it is estimated that, the driver is not in a state that makes it difficult to continue driving, and thus the automatic vehicle stop determination processing with ACC/CC OFF is terminated.

In step S14, the automatic vehicle stop determiner 32 determines the state of the accelerator non-operation time timer Tn. When the accelerator non-operation time timer Tn is zero, that is, the initial value, (Tn=0 in step S14, the flow proceeds to step S15. In step S15, measurement of time with the accelerator non-operation time timer Tn starts. When the accelerator non-operation time timer Tn is longer than 0 and shorter than the accelerator non-operation time threshold value Tnth1 (0<Tn<Tnth1 in step S14), the flow proceeds to step 316. In step S16, measurement of time with the accelerator non-operation time timer Tn continues. When the accelerator non-operation time timer Tn is longer than the accelerator non-operation time threshold value Tnth1 (Tnth1<=Tn in step S14), the flow proceeds to step S17. In step S17, the accelerator non-operation flag Fa is set to 1 (the flag is set).

In step S18, the automatic vehicle stop determiner 32 determines whether or not a switching operation of the emergency vehicle stop switch is performed, based on the ON signal of the emergency vehicle stop switch 12. When the driver falls into a state that makes it difficult to continue driving, an occupant intends to execute automatic vehicle stop control by performing a switching operation of the emergency vehicle stop switch 12. Also, when execution of the automatic vehicle stop control is unnecessary, an occupant intends to cancel the automatic vehicle stop control by performing a switching operation of the emergency vehicle stop switch 12. When a switching operation is performed (YES in step S18), the flow proceeds to step S19. When no switching operation is performed (NO in step S18), the flow proceeds to step S23. At this point, the effectiveness of the switching operation is also determined, and the details will be explained in the later-described [1-5. Relationship between Operation of Emergency Vehicle Stop Switch 12 and Execution of Automatic Vehicle Stop Control].

In step S19, the automatic vehicle stop determiner 32 determines whether or not the last switching operation of the emergency vehicle stop switch 12 is an operation that intends to execute the automatic vehicle stop control. Specifically, when a switching operation of the emergency vehicle stop switch 12 is considered to be effective in a state where automatic vehicle stop control is not executed, it is determined that the switching operation intends to execute the automatic vehicle stop control. On the other hand, after it is determined that the switching operation intends to execute the automatic vehicle stop control, when the emergency vehicle stop switch 12 is operated again and the switching operation is considered to be effective, it is determined that the switching operation intends to cancel the execution of the automatic vehicle stop control. When the operation intends to execute the automatic vehicle stop control (YES in step S19), the flow proceeds to step S20. When the operation intends to cancel the execution of the automatic vehicle stop control (NO in step S19), the automatic vehicle stop control is unnecessary, and thus the automatic vehicle stop determination processing with ACC/CC OFF is terminated.

In step S20, the automatic vehicle stop determiner 32 determines whether or not the switch operation flag Fs is the initial value 0. When the switch operation flag Fs is the initial value 0 at this point (YES in step S20), the flow proceeds to step S21. When the switch operation flag Fs is already 1 at this point (NO in step S20), the flow proceeds to step S23.

In step S21, the automatic vehicle stop determiner 32 initializes the accelerator non-operation time timer Tn to allow measurement of an accelerator non-operation time after the emergency vehicle stop switch 12 is operated. In step S22, the automatic vehicle stop determiner 32 sets the switch operation flag Fs to 1 (flag is set).

In step S23, the automatic vehicle stop determiner 32 determines the states of the accelerator non-operation flag Fa and the switch operation flag Fs. Here, it is determined whether or not the driver is in a state that makes it difficult to continue driving. When the switch operation flag Fs is 0 (initial value) regardless of the accelerator non-operation flag Fa (Fa=0 or 1, Fs=0 in step S23), the flow returns to step S13. This indicates the state where a switching operation of the emergency vehicle stop switch 12 is not performed. When the accelerator non-operation flag Fa is 0 (initial value) and the switch operation flag Fs is 1 (Fa=0, Fs=1 in step S23), the flow proceeds to step S24. This indicates the state where a switching operation of the emergency vehicle stop switch 12 is performed to execute the automatic vehicle stop control and the accelerator non-operation time timer Tn has not reached the accelerator non-operation time threshold value Tnth1. When the accelerator non-operation flag Fa and the switch operation flag Fs are 1 (Fa=1, Fs=1 in step S23), the flow proceeds to step S25. This indicates the state where a switching operation of the emergency vehicle stop switch 12 is performed to execute the automatic vehicle stop control and the accelerator non-operation time timer Tn has reached the accelerator non-operation time threshold value Tnth1.

In step S24, the automatic vehicle stop determiner 32 executes first deceleration, control as well as lane keeping control and others. The emergency vehicle controller 30 commands the brake controller 44 to execute automatic deceleration with a first deceleration G1. Also, the emergency vehicle controller 30 commands the steering controller 40 to execute the lane keeping control and others. After step S24, the flow returns to step S13.

In step S25, the automatic vehicle stop determiner 32 executes the automatic vehicle stop control. Specifically, the emergency vehicle controller 30 commands the brake controller 44 to execute automatic deceleration (a second deceleration control) with a second deceleration G2 (>G1). In addition, the emergency vehicle controller 30 commands the steering controller 40 to execute the lane keeping control and others. Furthermore, the emergency vehicle controller 30 commands the meter controller 48 to blink each direction indicator 68 on the right and left, so-called the hazard lamp. Furthermore, the emergency vehicle controller 30 commands the notification controller 46 to provide voice guidance and state display. After step S25, the automatic vehicle stop determination processing with ACC/CC OFF is terminated. It is to be noted that even when the steering wheel of the steering 52 is operated by an occupant, the automatic vehicle stop determiner 32 executes the automatic vehicle stop control regardless of the operation.

[1-2-3. Automatic Vehicle Stop Determination Processing with ACC/CC ON]

Figure 4:
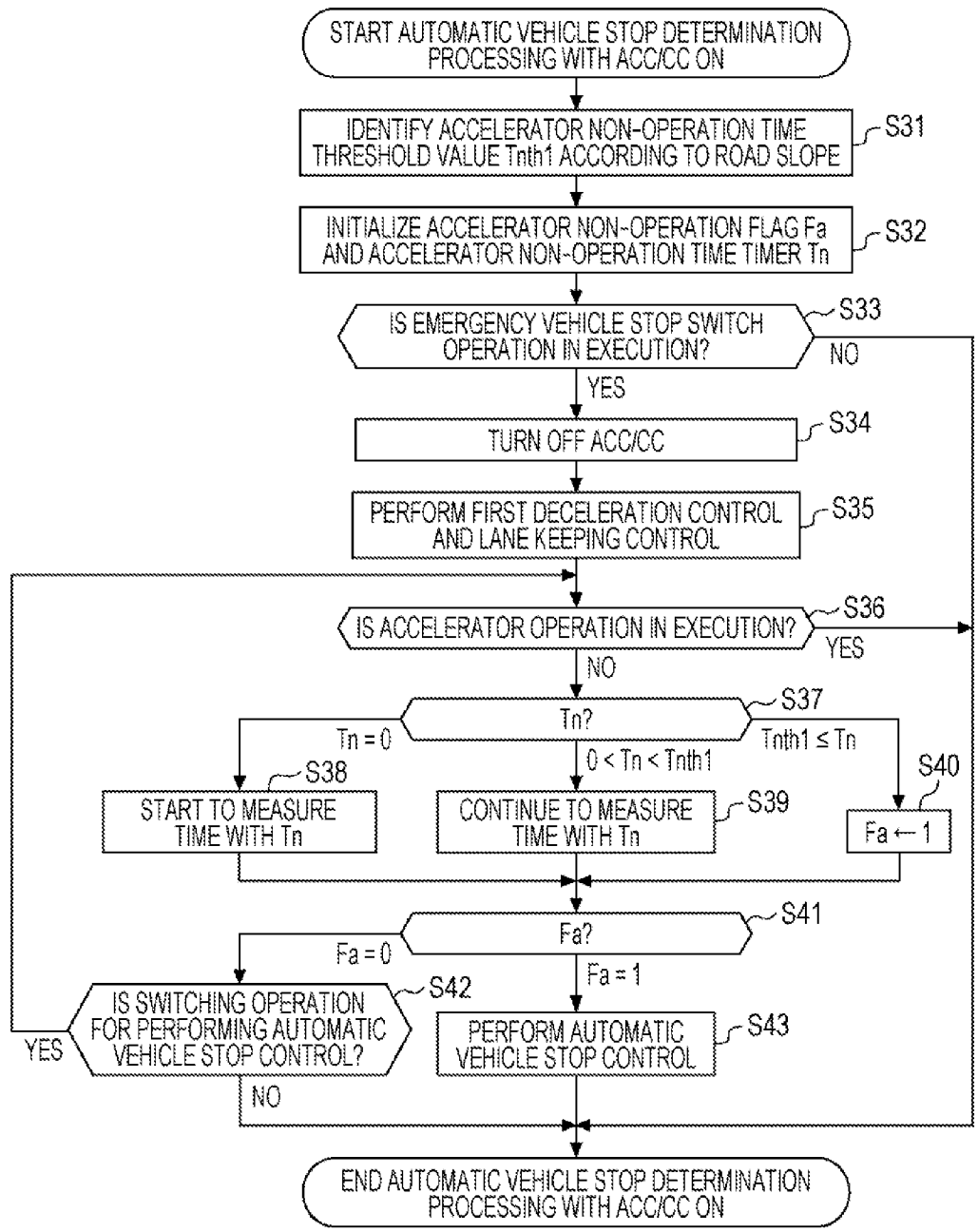

The flow of the automatic vehicle stop determination processing with ACC/CC ON will be described with reference to FIG. 4. Step S31 and step S32 are generally the same as step S11 and step S12 illustrated in FIG. 3. However, here, the switch operation flag Fs used by the automatic vehicle stop determination processing with ACC/CC OFF is not used. Therefore, in step S32, initialization of the switch operation flag Fs is unnecessary.

In step S33, the automatic vehicle stop determiner 32 determines whether or not a switching operation of the emergency vehicle stop switch is performed, based on the ON signal of the emergency vehicle stop switch 12. When a switching operation is performed (YES in step S33), the flow proceeds to step S34. When no switching operation is performed (NO in step S33), it is estimated that the driver is not in a state that makes it difficult to continue driving, and thus the automatic vehicle stop determination processing with ACC/CC ON is terminated.

In step S34, the automatic vehicle stop determiner 32 switches ACC/CC from an state to an OFF state. The automatic vehicle stop determiner 32 commands the cruise controller 42 to switch ACC/CC to OFF. At this point, the automatic vehicle stop determiner 32 commands the cruise controller 42 to prohibit switching of ACC/CC to ON. In this manner, when the emergency vehicle stop switch 12 is operated during execution of ACC/CC, execution of ACC/CC by the cruise controller 42 is stopped, and subsequent execution of ACC/CC is further prohibited.

In step S35, the automatic vehicle stop determiner 32 executes the first deceleration control as well as the lane keeping control and others. The emergency vehicle controller 30 commands the brake controller 44 to execute the automatic deceleration with the first deceleration G1. In addition, the emergency vehicle controller 30 commands the steering controller 40 to execute the lane keeping control and others.

In step S36, the automatic vehicle stop determiner 32 determines whether or not an accelerator operation is performed, based on the output of the accelerator operation detector 14. Since step S36 to step S40 are the same as step S13 to step S17 illustrated in FIG. 3, a description of step S36 to step S40 is omitted.

In step S41, the automatic vehicle stop determiner 32 determines the state of the accelerator non-operation flag Fa. Here, it is determined whether or not the driver is in a state that makes it difficult to continue driving. When the accelerator non-operation flag Fa is 0 (initial value) (Fa=0 in step S41), the flow proceeds to step S42. This indicates the state where the accelerator non-operation time timer Tn has not reached the accelerator non-operation time threshold value Tnth1. When the accelerator non-operation flag Fa is 1 (Fa=1 in step S41), the flow proceeds to step S43. This indicates the state where the accelerator non-operation time timer Tn has reached the accelerator non-operation time threshold value Tnth1.

In step S42, it is determined whether or not the last switching operation of the emergency vehicle stop switch 12 is an operation that intends to execute the automatic vehicle stop control. Specifically, when a switching operation of the emergency vehicle stop switch 12 is considered to be effective in a state where automatic vehicle stop control is not executed, it is determined that the switching operation intends to execute the automatic vehicle stop control. On the other hand, after it is determined that the switching operation intends to execute the automatic vehicle stop control, when the emergency vehicle stop switch 12 is operated again and the switching operation is considered to be effective, it is determined that the switching operation intends to cancel the execution of the automatic vehicle stop control. When the operation intends to execute the automatic vehicle stop control (YES in step S42), the flow returns to step S36. When the operation intends to cancel the execution of the automatic vehicle stop control (NO in step S42), the automatic vehicle stop control is unnecessary, and thus the automatic vehicle stop determination processing with ACC/CC OFF is terminated.

In step S43, the automatic vehicle stop determiner 32 executes the automatic vehicle stop control. Since step S43 is the same as step S25 illustrated in FIG. 3, a description of step S43 is omitted.

[1-2-4. Automatic Vehicle Stop Cancellation Determination Processing]

The flow of the automatic vehicle stop cancellation determination processing will foe described with reference to FIG. 5. In step S51, the automatic vehicle stop cancellation determiner 34 initializes the accelerator non-operation time timer Tn and accelerator operation time timer Tc. As described above, the accelerator non-operation time timer Tn is a timer that measures an accelerator non-operation time. The accelerator operation time timer Tc is a timer that measures an accelerator operation time.

In step S52, the automatic vehicle stop cancellation determiner 34 starts to measure time with the accelerator non-operation time timer Tn.

In step S53, the automatic vehicle stop determiner 32 determines whether or not an accelerator operation is performed, based on the output of the accelerator operation detector 14. When an accelerator operation is performed (YES in step S53), the flow proceeds to step S54. When no accelerator operation is performed (NO in step S53), the flow proceeds to step S58.

In step S54, the automatic vehicle stop determiner 32 stops the measurement of time with the accelerator non-operation time timer Tn, and starts to measure time with the accelerator operation time timer Tc. While an accelerator operation is being detected, the automatic vehicle stop determiner 32 commands the brake controller 44 to suspend the automatic vehicle stop control (the second deceleration control) and an accelerator operation by the driver is preferentially performed. Like this, with the automatic vehicle stop control continued, allowing manual control by the driver to be preferentially executed over automatic control is called override.

In step S55, the automatic vehicle stop determiner 32 determines whether or not the accelerator operation time timer Tc is longer than or equal to the accelerator operation time threshold value Tcth. When the accelerator operation time timer Tc is longer than or equal to the accelerator operation time threshold value Tcth (YES in step S55), the flow proceeds to step S59. When the accelerator operation time timer Tc is shorter than the accelerator operation time threshold value Tcth (NO in step S55), the flow proceeds to step S56.

In step S56, the automatic vehicle stop determiner 32 determines whether or not an accelerator operation is performed, based on the output of the accelerator operation detector 14. When an accelerator operation is performed (YES in step S56), the flow returns to step S55 and override is continued. When no accelerator operation is performed (NO in step S56), the flow proceeds to step S57.

In step S57, the automatic vehicle stop determiner 32 terminates the measurement of time with the accelerator operation time timer Tc, and resumes measurement of time with the accelerator non-operation time timer Tn. In addition, the automatic vehicle stop determiner 32 commands the brake controller 44 to resume the automatic vehicle stop control.

In step S58, the automatic vehicle stop determiner 32 determines whether or not the accelerator non-operation time timer Tn is longer than or equal to accelerator non-operation time threshold value Tnth2 (>Tnth1). When override is repeatedly performed, the total accelerator non-operation time increases. When the total accelerator non-operation time increases due to repeatedly performed override, it is estimated that the driver is not in a state that makes it difficult to continue driving. When the accelerator non-operation time timer Tn is longer than or equal to the accelerator non-operation time threshold value Tnth2 (YES in step S58), the flow proceeds to step S53. In step S59, the automatic vehicle stop determiner 32 commands the brake controller 44 to cancel the automatic vehicle stop control. On the other hand, when the accelerator non-operation time timer Tn is shorter than the accelerator non-operation time threshold value Tnth2 (NO in step S58), the flow proceeds to step S60.

In step S60, the automatic vehicle stop determiner 32 determines whether or not the vehicle is stopped. When the vehicle is stopped (YES in step S60), the flow proceeds to step S61. In step S61, the automatic vehicle stop determiner 32 commands the brake controller 44 to keep the vehicle stopped. On the other hand, when the vehicle is not stopped (NO in step S60), the flow returns to step S53 and the automatic vehicle stop control is continued.

[1-3. State Transition of Emergency Vehicle Control Device 10]

Figure 6:
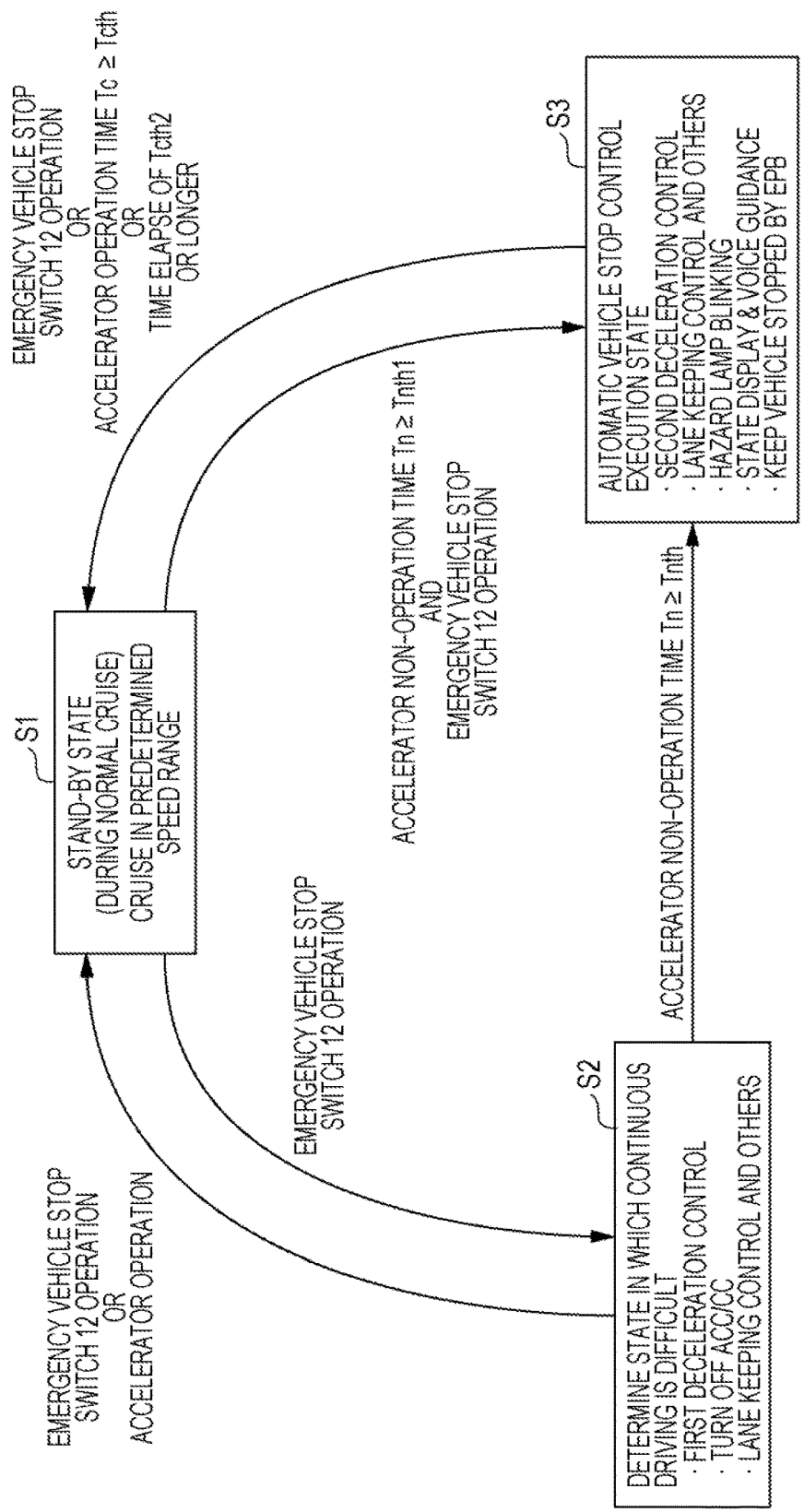
FIG. 6 is a state transition diagram of the emergency vehicle control device.

FIG. 6 illustrates the state transition of the emergency vehicle control device 10 in the processing illustrated in FIGS. 2 to 5. The state transition of the emergency vehicle control device 10 will be described with reference to FIG. 6. The emergency vehicle control device 10 makes a transition between three states: a stand-by state (state S1), a state (state S2) in which the driver's state that makes it difficult to continue driving is determined, and an automatic vehicle stop control execution state (state S3).

In the state S1 which is stand-by state, the vehicle is running normally in a predetermined speed range. In this state, the driver is not in a state that makes it difficult to continue driving.

In the state S2 in which the driver's state that makes it difficult to continue driving is determined, the first deceleration control is executed, ACC/CC is switched to OFF, and the lane keeping control and others are executed.

In the state S3 which is the automatic vehicle stop control execution state, the second deceleration control is executed, a hazard lamp (each direction indicator 68 on the right and left) blinks, and voice guidance by the speaker 62 and state display by the display 64 are executed. In addition, when the vehicle is stopped, the vehicle is kept stopped by the EPB 60.

A transition from the state S1 to the state S2 is triggered by an execution operation of automatic vehicle stop control using the emergency vehicle stop switch 12. The reason why only an execution operation of automatic vehicle stop control by the emergency vehicle stop switch 12 does not cause a transition to the state S3 is to prevent the automatic vehicle stop control from being executed in case of erroneous operation of the emergency vehicle stop switch 12 by an occupant. A transition from the state S2 to the state S1 is triggered by a cancellation operation of execution of the automatic vehicle stop control by the emergency vehicle stop switch 12. A transition from the state S2 to the state S1 is also triggered by detection of an accelerator operation, made by the accelerator operation detector 14.

A transition from the state S1 to the state S3 is triggered by detection of non-operation of the accelerator for the accelerator non-operation time threshold value Tnth1 or longer, made by the accelerator operation detector 14 and an execution operation of the automatic vehicle stop control by the emergency vehicle stop switch 12. A transition from the state S3 to the state S1 is triggered by a cancellation operation of execution of the automatic vehicle stop control by the emergency vehicle stop switch 12. The transition is also triggered by detection of an accelerator operation for the accelerator operation time threshold value Tcth or longer, made by the accelerator operation detector 14. The transition is also triggered by detection of an accelerator non-operation time for the accelerator non-operation time threshold value Tnth2 or longer.

A transition from the state S2 to the state S3 is triggered by detection of non-operation of the accelerator for the accelerator non-operation time threshold value Tnth1 or longer, made by the accelerator operation detector 14.

[1-4. Operational Sequence of Emergency Vehicle Control Device 10]

The operational sequence of the emergency vehicle control device 10 will be described by giving five specific examples with reference to FIGS. 7 to 11 in the following.

Example 1: Case where Difficulty of Continuous Driving is Determined Before Operation of Emergency Vehicle Stop Switch 12

Figure 7:
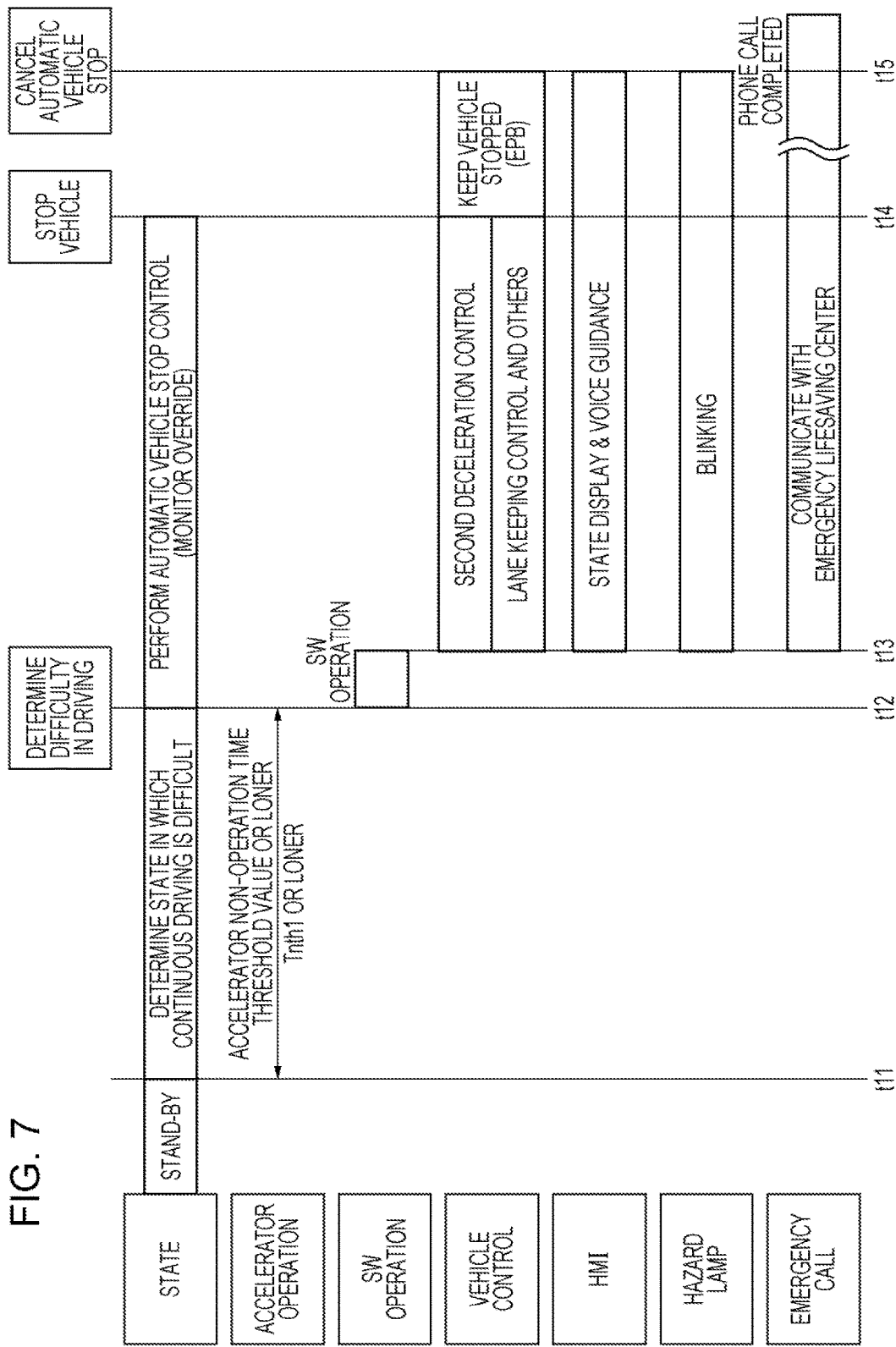
FIG. 7 is a first operational sequence diagram of the first embodiment.

As illustrated in FIG. 7, it is assumed that an accelerator operation is performed by the driver in the stand-by state until time t11. When the driver stops the accelerator operation at time t11 and no accelerator operation is performed, measurement of time with the accelerator non-operation time timer Tn starts. During this period, there is a possibility that the driver is in a state that makes it difficult to continue driving.

It is assumed that an occupant determines that the driver is in a state that makes it difficult to continue driving and operates the emergency vehicle stop switch 12 (SW) starting from time t12 at which the accelerator non-operation time timer Tn is greater than or equal to the accelerator non-operation time threshold value Tnth1 until time t13. At this point, the driver's state making it difficult to continue driving is determined, and the automatic vehicle stop control is executed by the emergency vehicle controller 30. At this point, the second deceleration control, the lane keeping control, and the road departure mitigation control are executed. At the same timing, state display and voice guidance are provided by the display 64 and the speaker 62 as a human machine interface (HMI). Alternatively, each direction indicator 68 on the right and left blinks as a hazard lamp. In response to an operation of the emergency vehicle stop switch 12 (SW), the emergency communication unit 24 establishes a communication line to an emergency lifesaving center. Thus, phone call is possible between a communication terminal provided in the emergency communication unit 24 and a communication terminal of the emergency lifesaving center.

The vehicle is stopped at time t14 as a result of the second deceleration control. Then, in response to a command from the emergency vehicle controller 30, the EPB 60 operates and keeps the vehicle stopped. When an occupant performs a release operation of the automatic vehicle stop at time t15, the EPB 60 releases the stopped vehicle. At the same time, the display 64 and the speaker 62 terminate the state display and voice guidance, and lights off each direction indicator 68. The emergency communication unit 24 maintains the communication line until the phone call is completed.

Example 2: Case 1 where Difficulty of Continuous Driving is Determined After Operation of Emergency Vehicle Stop Switch 12

Figure 8:
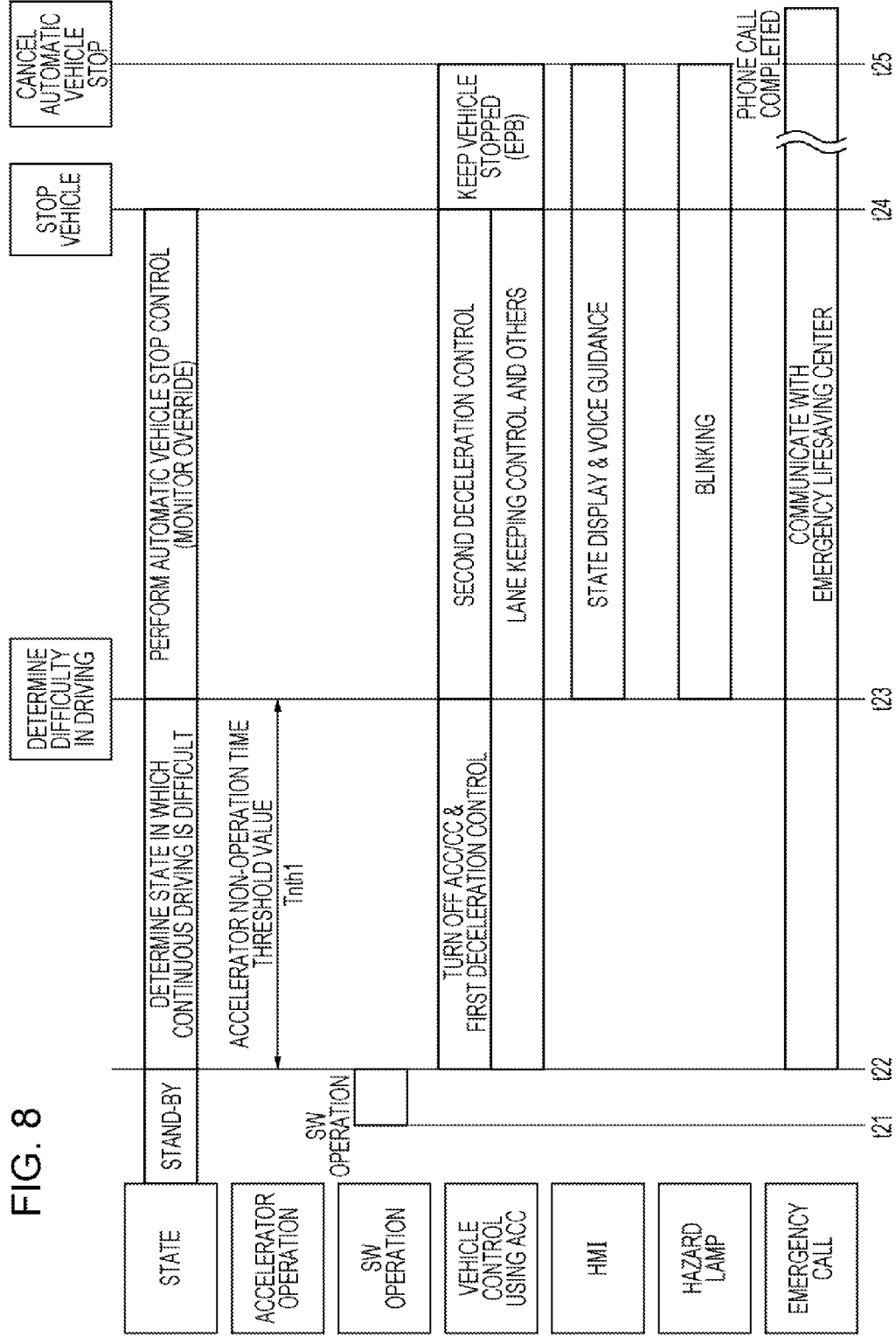
FIG. 8 is a second operational sequence diagram of the first embodiment.

The operational sequence illustrated in FIG. 8 is executed by a vehicle in which ACC/CC is in operation. It is assumed that an occupant determines that the driver is in a state that makes it difficult to continue driving and operates the emergency vehicle stop switch 12 (SW) starting from time t21 in the stand-by state until time t22. At this point, it is probable that the driver is in a state that makes it difficult to continue driving.

At time t22, measurement of time with the accelerator non-operation time timer Tn starts. At this point, OFF operation of ACC/CC, the first deceleration control, the lane keeping control, and the road departure mitigation control are executed. In response to an operation of the emergency vehicle stop switch 12 (SW), the emergency communication unit 24 establishes a communication line to an emergency lifesaving center. Thus, phone call is possible between a communication terminal provided in the emergency communication unit 24 and a communication terminal of the emergency lifesaving center.

The operational sequence at and after time t23 is the same as the operational sequence at and after time t13 illustrated FIG. 7. The driver's state making it difficult to continue driving is determined at time t23 at which the accelerator non-operation time timer Tn reaches the accelerator non-operation time threshold value Tnth1, and the automatic vehicle stop control is executed by the emergency vehicle controller 30. At this point, the second deceleration control is executed, and the lane keeping control and the road departure mitigation control are continued. At the same timing, state display and voice guidance are provided by the display 64 and the speaker 62 as a human machine interface (HMI). Alternatively, each direction indicator 68 on the right and left blinks as a hazard lamp.

The vehicle is stopped at time t24 as a result of the second deceleration control. Then, in response to a command from the emergency vehicle controller 30, the EPB 60 operates and keeps the vehicle stopped. When an occupant performs a release operation of the automatic vehicle stop at time t25, the EPB 60 releases the stopped vehicle. At the same time, the display 64 and the speaker 62 terminate the state display and voice guidance, and lights off each direction indicator 68. The emergency communication unit 24 maintains the communication line until the phone call is completed.

Example 3: Case 3 where Difficulty of Continuous Driving is Determined After Operation of Emergency Vehicle Stop Switch 12

Figure 9:
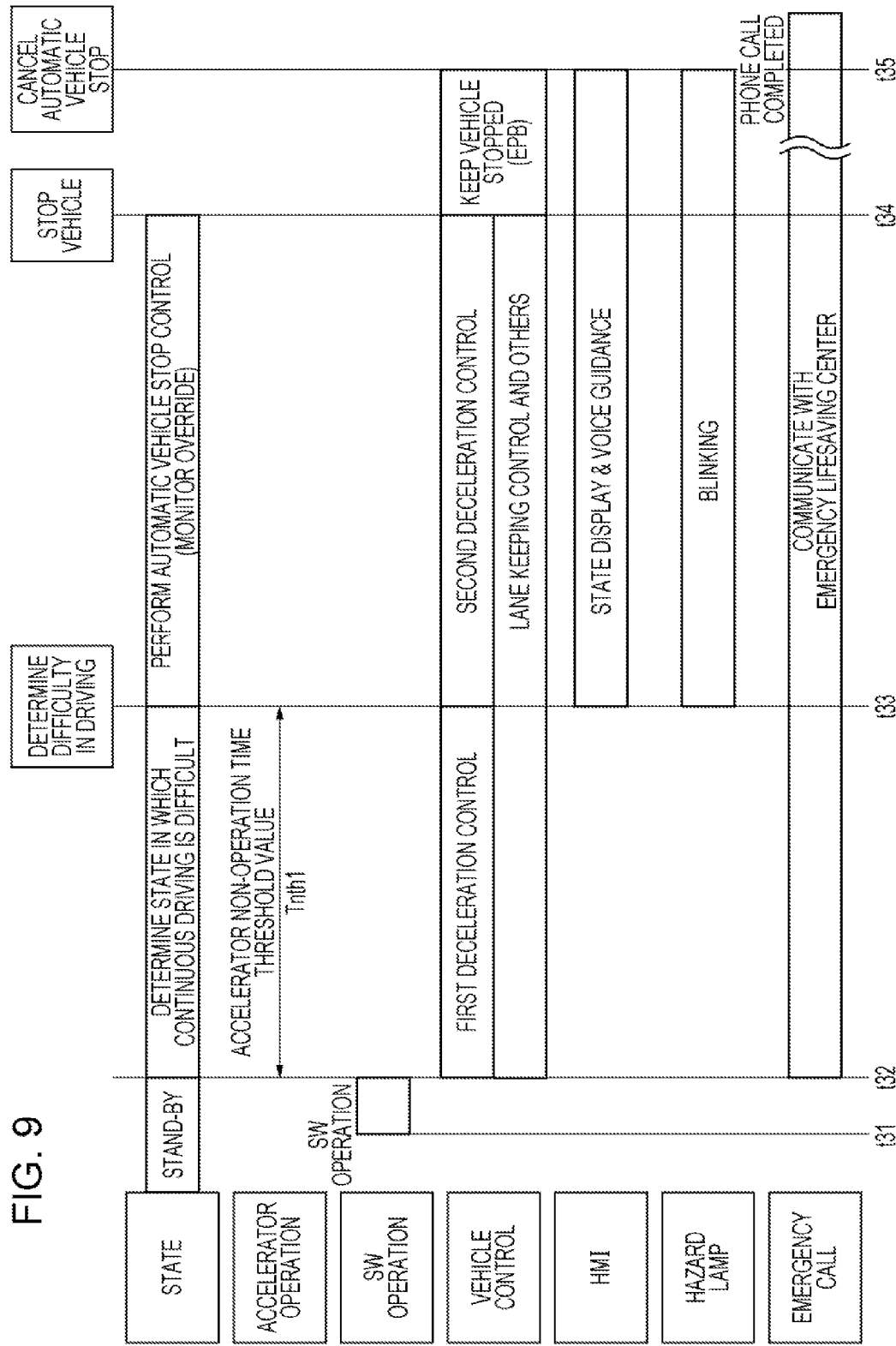
FIG. 9 is a third operational sequence diagram of the first embodiment.

The operational sequence illustrated in FIG. 9 is executed by a vehicle in which ACC/CC is not in operation. The difference between the operational sequence illustrated in FIG. 9 and the operational sequence illustrated in FIG. 8 is whether or not an OFF operation of ACC/CC is performed. That is, in the operational sequence illustrated in FIG. 9, the processing performed at time t32 does not include an OFF operation of ACC/CC. Except for that, both operational sequences are the same.

Figure 10:
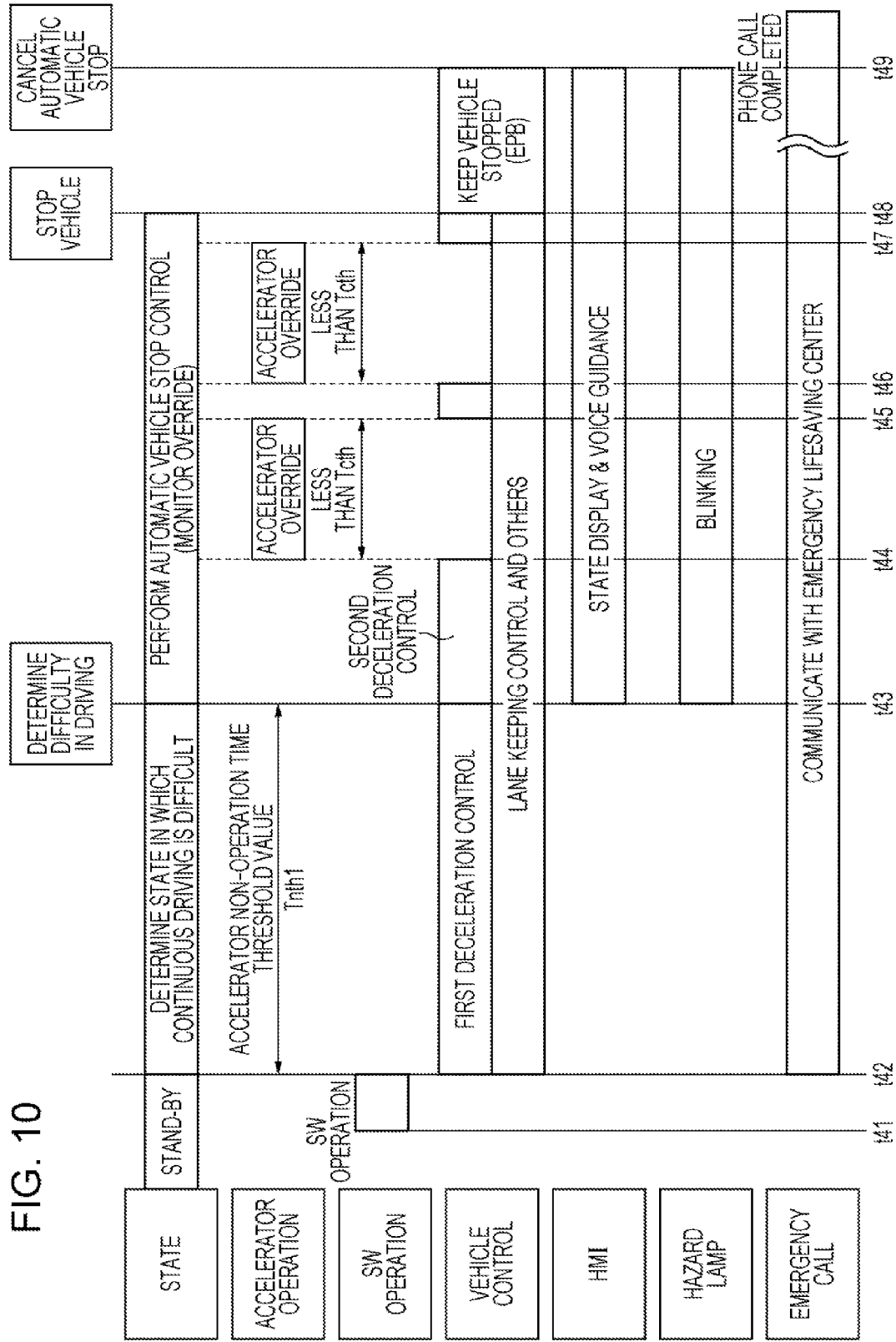
FIG. 10 is a fourth operational sequence diagram of the first embodiment.

Example 4: Case 1 where Override is Performed During Execution of Automatic Vehicle Stop Control The operational sequence during time t41 to t43 illustrated in FIG. 10 is the same as the operational sequence during time t31 to t33 illustrated in FIG. 9.

At time t44, the driver is assumed to perform the override by an accelerator operation. Then, the second deceleration control out of the vehicle control is suspended. On the other hand, the lane keeping control and the road departure mitigation control are continued. At this point, measurement of time with the accelerator operation time timer Tc starts. When no accelerator operation is performed at time t45 at which the accelerator operation time timer Tc is shorter than the accelerator operation time threshold value Tcth, the second deceleration control is resumed.

The operational sequence between time t46 and t47 is the same as the operational sequence between time t44 and t45.

The vehicle is stopped at time t48 as a result of the second deceleration control. Then, in response to a command from the emergency vehicle controller 30, the EPB 60 operates and keeps the vehicle stopped. When an occupant performs a release operation of the automatic vehicle stop at time t49, the EPB 60 releases the stopped vehicle. At the same time, the display 64 and the speaker 62 terminate the state display and voice guidance, and lights off each direction indicator 68. The emergency communication unit 24 maintains the communication line until the phone call is completed.

Figure 11:
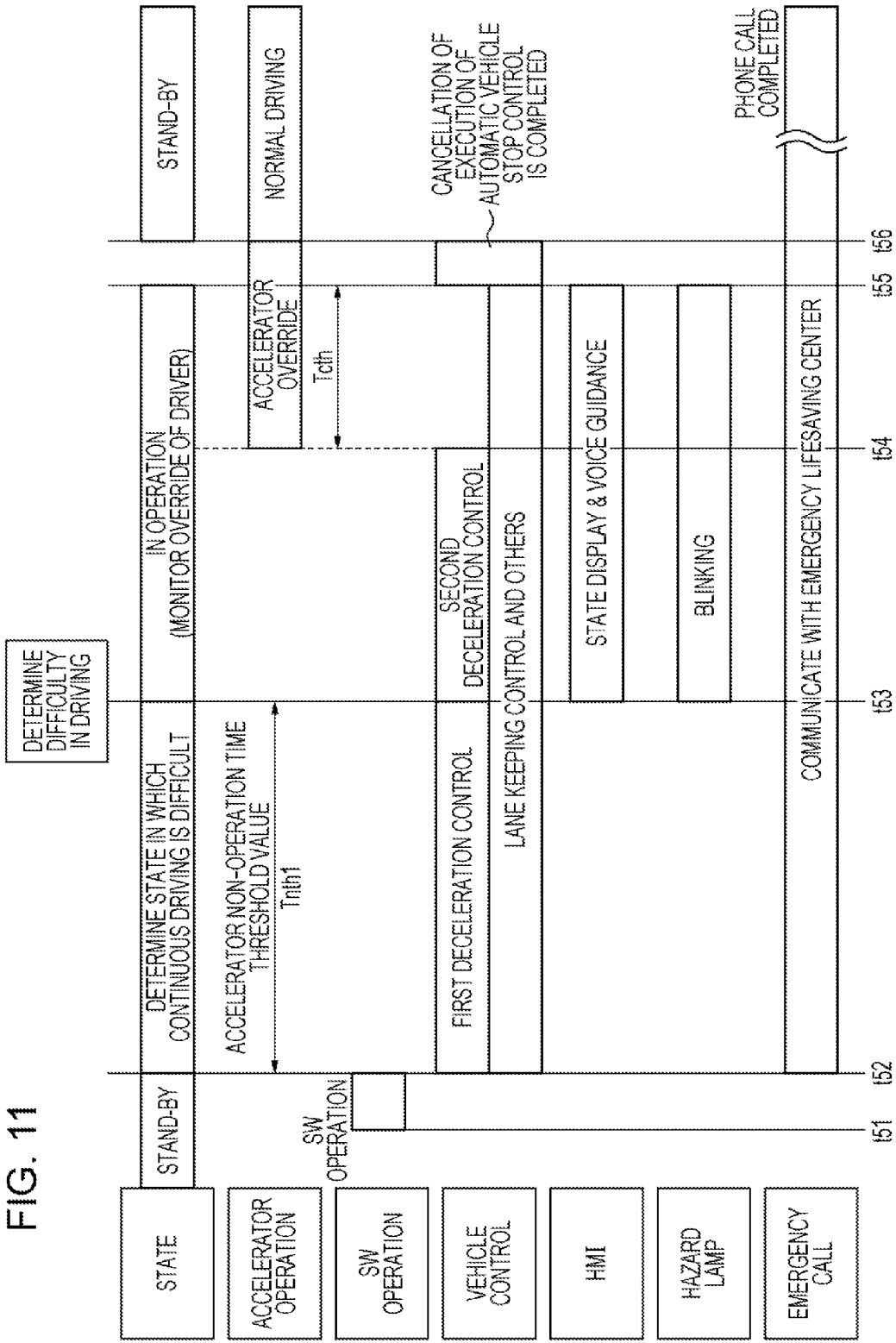
FIG. 11 is a fifth operational sequence diagram of the first embodiment.

Example 5: Case 2 where Override is Performed During Execution of Automatic Vehicle Stop Control The operational sequence during time t51 to t53 illustrated in FIG. 11 is the same as the operational sequence during time t31 to t33 illustrated in FIG. 9 and the operational sequence during time t41 to t43 illustrated in FIG. 10.

At time t54, the driver is assumed to perform the override by an accelerator operation. Then, the second deceleration control out of the vehicle control is suspended. On the other hand, the lane keeping control and the road departure mitigation control are continued. At this point, measurement of time with the accelerator operation time timer Tc starts. At time t55 at which the accelerator operation time timer Tc reaches the accelerator operation time threshold value timer Tcth, execution of the automatic vehicle stop control is cancelled. At time t56 at which no accelerator operation is performed, the operational sequence returns to the stand-by state and normal driving is possible. The emergency communication unit 24 maintains the communication line until the phone call is completed.

[1-5. Relationship between Operation of Emergency Vehicle Stop Switch 12 and Execution of Automatic Vehicle Stop Control]

Specific operation patterns of the emergency vehicle stop switch 12 are illustrated in FIGS. 12A to 12B and FIGS. 13A to 13D, and the relationship between switch operation and execution of automatic vehicle stop control as well as cancellation of execution will be described.

FIGS. 12A to 12D illustrate four operation patterns of the emergency vehicle stop switch 12, which are performed when the automatic vehicle stop control is executed.

FIG. 12A illustrates a basic operation pattern in which the emergency vehicle stop switch 12 is operated, then no accelerator operation for the accelerator non-operation time threshold value Tnth1 or longer is detected, and the automatic vehicle stop control is executed. An operation of the emergency vehicle stop switch 12 is considered to be effective when the operation time Ts (time ta1 to time ta2) of the emergency vehicle stop switch 12 reaches a first operation time threshold value Tsth1. When an accelerator non-operation state continues since the operation start time (time ta1) of the emergency vehicle stop switch 12 and the accelerator non-operation time timer Tn reaches the accelerator non-operation time threshold value Tnth1 (time ta3), the automatic vehicle stop control is executed.

FIG. 12B illustrates a pattern in which when the automatic vehicle stop control is executed, the emergency vehicle stop switch 12 is continuously operated for a long time. An operation of the emergency vehicle stop switch 12 is considered to be effective at the time (time tb2) at which the operation time Ts (time tb1–) of the emergency vehicle stop switch 12 reaches the first operation time threshold value Tsth1. Even when the emergency vehicle stop switch 12 is continuously operated at and after time tb2, determination of execution is not affected.

FIG. 12C illustrates a pattern in which when the automatic vehicle stop control is executed, the emergency vehicle stop switch 12 is repeatedly operated for a short time, causing a first operation at a first timing and lasting for a first period of time from tc1 and a following second operation at a second timing and lasting for a second period of time from tc3. When the driver falls into a state that makes it difficult to continue driving, an occupant may panic and repeatedly operate the emergency vehicle stop switch 12. For instance, a push type switch may be repeatedly pressed. Then, ON and OFF are repeated and it is difficult to determine execution of the automatic vehicle stop control. Thus, effectiveness of a switch operation in a panic state has to be appropriately determined. In the present embodiment, effectiveness of a switch operation is determined in the following manner.

Similarly to the pattern of FIG. 12A, an operation of the emergency vehicle stop switch 12 is considered to be effective at the time at which the first operation time Ts (time tc1 to tc2) of the emergency vehicle stop switch 12 reaches the operation time threshold value Tsth1. Subsequently, even when the emergency vehicle stop switch 12 is operated with an elapsed time Tsi from the first operation start time (time tc1) of the emergency vehicle stop switch 12 between the first operation time threshold value Tsth1 and a second operation interval threshold value Tsth2, determination of execution is sot affected. When an accelerator non-operation state continues since the operation start time (time tc1) of the emergency vehicle stop switch 12 and the accelerator non-operation time timer Tn reaches the accelerator non-operation time threshold value Tnth1 (time tc4), the automatic vehicle stop control is executed. Like this, even when the emergency vehicle stop switch 12 is operated with an elapsed time Tsi from the last operation start time of the emergency vehicle stop switch 12 between the first operation time threshold value Tsth1 and the second operation interval threshold value Tsth2, determination of execution is not affected.

FIG. 12D illustrates a modified pattern of FIG. 12C, in which the emergency vehicle stop switch 12 is repeatedly operated continuously for a short time even after the execution of the automatic vehicle stop control. Even when the emergency vehicle stop switch 12 is operated with an elapsed time Tsi from the last operation start time of the emergency vehicle stop switch 12 between the first operation time threshold value Tsth1 and the second operation interval threshold value Tsth2, determination of execution is not affected. In other words, as long as the elapsed time Tsi from the last operation start time of the emergency vehicle stop switch 12 does not exceed the second operation interval threshold Tsth2, the operation of the emergency vehicle stop switch 12 is considered to be ineffective.

FIGS. 13A to 13D illustrate four operation patterns of the emergency vehicle stop switch 12, which are performed when execution of the automatic vehicle stop control is cancelled.

FIG. 13A illustrates a pattern in which no accelerator operation is performed for the accelerator non-operation time threshold value Tnth1 or longer, then the automatic vehicle stop control is executed by an operation of the emergency vehicle stop switch 12, and the execution of the automatic vehicle stop control is cancelled. An operation of the emergency vehicle stop switch 12 is considered to be effective when the first operation time Ts (time te1 to te2) of the emergency vehicle stop switch 12 reaches the first operation time threshold value Tsth1. At time te2, the accelerator non-operation time timer Tn has already reached the accelerator non-operation time threshold value Tnth1, and thus the automatic vehicle stop control is executed. When elapsed time Tsi from the operation end time (time te2) of the emergency vehicle stop switch 12 exceeds the second operation interval threshold value Tsth2, cancellation of the execution of the automatic vehicle stop control is possible. The emergency vehicle stop switch 12 is assumed to be operated again at time te3 at which the second operation interval threshold value Tsth2 has elapsed since time te2. An operation of the emergency vehicle stop switch 12 is considered to be effective when the second operation time Ts (time te3 to te4) of the emergency vehicle stop switch 12 reaches the first operation time threshold value Tsth1. Then, execution of the automatic vehicle stop control is cancelled.

FIG. 13B illustrates a pattern in which the emergency vehicle stop switch 12 is operated, then no accelerator operation for the accelerator non-operation time threshold value Tnth1 or longer is detected, and the automatic vehicle stop control is executed, then execution of the automatic vehicle stop control is cancelled. An operation of the emergency vehicle stop switch 12 is considered to be effective when the first operation time Ts (time tf1 to tf2) of the emergency vehicle stop switch 12 reaches the first operation time threshold value Tsth1. When an accelerator non-operation state continues since the operation start time (time tf1) of the emergency vehicle stop switch 12 and the accelerator non-operation time timer Tn reaches the accelerator non-operation time threshold value Tnth1 (time tf3), the automatic vehicle stop control is executed. When elapsed time Tsi from the start time (time tf3) of execution of the automatic vehicle stop control exceeds the second operation interval threshold value Tsth2, cancellation of the execution of the automatic vehicle stop control is possible. The emergency vehicle stop switch 12 is assumed to be operated again at time tf4 at which the second operation interval threshold value Tsth2 has elapsed since time tf3. An operation of the emergency vehicle stop switch 12 is considered to be effective when the second operation time Ts (time tf4 to tf5) of the emergency vehicle stop switch 12 reaches the first operation time threshold value Tsth1. Then, execution of the automatic vehicle stop control is cancelled.

FIG. 13C illustrates a modified pattern of FIG. 13B, in which the emergency vehicle stop switch 12 is repeatedly operated for a short time when execution of the automatic vehicle stop control is cancelled, causing a third operation at a third timing and lasting for a third period of time after the second operation of from time tg4 to tg5. Similarly to the pattern of FIG. 13B, an operation of the emergency vehicle stop switch 12 is considered to be effective at the time at which the second operation time Ts (time tg4 to tg5) of the emergency vehicle stop switch 12 reaches the first operation time threshold value Tsth1. Then, execution of the automatic vehicle stop control is cancelled. Subsequently, even when the emergency vehicle stop switch 12 is operated with an elapsed time Tsi from the second operation start time (time tg4) of the emergency vehicle stop switch 12 between the first operation time threshold value Tsth1 and the second operation interval threshold value Tsth2, determination of cancellation is not affected. Like this, even when the emergency vehicle stop switch 12 is operated with an elapsed time Tsi from the last, operation start time of the emergency vehicle stop switch 12 between the first operation time threshold value Tsth1 and the second operation interval threshold value Tsth2, determination of cancellation is not affected.

FIG. 13D illustrates a modified pattern of FIG. 13B, in which the emergency vehicle stop switch 12 is continuously operated for a long time when execution of the automatic vehicle stop control is cancelled. Similarly to the pattern of FIG. 13B, an operation of the emergency vehicle stop switch 12 is considered to be effective at the time (time th5) at which the second operation time Ts (time th4−) of the emergency vehicle stop switch 12 reaches the first, operation time threshold value Tsth1. Then, execution of the automatic vehicle stop control is cancelled. Even when the emergency vehicle stop switch 12 is continuously operated at and after time th5, determination of cancellation is not affected.

1-6. Summary of First Embodiment

The emergency vehicle control device 10 according to the first embodiment includes an automatic return emergency vehicle stop switch that is provided with a function of indicating an intention of an occupant regarding execution and cancellation of execution of automatic vehicle stop control of a vehicle which is running. When the emergency vehicle stop switch 12 is operated for the first operation time threshold value (the first predetermined time) Tsth1 or longer in a state where the automatic vehicle stop control is not executed, it is determined that the automatic vehicle stop control is intended to be executed. After it is determined that the automatic vehicle stop control is intended to be executed, when the interval between the previous operation and the current operation for the emergency vehicle stop switch 12 is within the second operation time threshold value (the second predetermined time) Tsth2 which is longer than the first operation time threshold value (the first predetermined time) Tsth1, the determination that the automatic vehicle stop control is intended to be executed is sustained. On the other hand, when the interval between the previous operation and the current operation for the emergency vehicle stop switch 12 exceeds the second operation time threshold value (the second predetermined time) Tsth2 and the emergency vehicle stop switch 12 is operated for the first operation time threshold value (the first predetermined time) Tsth1 or longer, it is determined that the execution of the automatic vehicle stop control is intended to be cancelled. According to the present disclosure, when the automatic return emergency vehicle stop switch 12 is repeatedly operated for a short time after automatic vehicle stop control is intended to be executed, it is possible to reliably execute the automatic vehicle stop control provided that the interval between operations is within the second operation time threshold value (the second predetermined time) Tsth2.

In the present embodiment, in the case where the emergency vehicle stop switch 12 is operated in a state where it is determined that the execution of the automatic vehicle stop control is intended to be cancelled, when the interval between the previous operation and the current operation for the emergency vehicle stop switch 12 is within the second operation time threshold value (the second predetermined time) Tsth2, the determination that the execution of the automatic vehicle stop control is intended to be cancelled is sustained. On the other hand, when the interval between the previous operation and the current operation for the emergency vehicle stop switch 12 exceeds the second operation time threshold value (the second predetermined time) Tsth2 and the emergency vehicle stop switch 12 is operated for the first operation time threshold value (the first predetermined time) Tsth1 or longer, it is determined that the automatic vehicle stop control is intended to be executed. According to the present disclosure, when the automatic return emergency vehicle stop switch 12 is repeatedly operated for a short time after the automatic vehicle stop control is intended to be cancelled, it is possible to reliably cancel the execution of the automatic vehicle stop control provided that the interval between operations is within the second operation time threshold value (the second predetermined time) Tsth2.

In the present disclosure, the emergency vehicle control device further includes a vehicle operation detector that detects a predetermined vehicle operation, specifically, the accelerator operation detector 14 that detects an accelerator non-operation state. In the case where it is determined by an operation of the emergency vehicle stop switch 12 during running of the vehicle that the automatic vehicle stop control is intended to be executed and an accelerator non-operation state is detected by the accelerator operation detector 14 (vehicle operation detector), the vehicle is automatically stopped. According to the present embodiment, the automatic vehicle stop control is executed when a vehicle operation and a switch operation are in a specific state. Thus erroneous operation of the automatic vehicle stop control is avoidable.

In the present embodiment, when an accelerator operation is performed during execution of the automatic vehicle stop control, the automatic vehicle stop control is temporarily stopped and the accelerator operation is preferentially performed. In addition, when the accelerator operation is continuously performed for a predetermined time or longer, the execution of the automatic vehicle stop control is cancelled. According to the present disclosure, an accelerator operation is temporarily allowed during the automatic vehicle stop control, and thus an acceleration operation is temporarily allowed under the automatic vehicle stop control. When the driver wants to perform an accelerator operation while executing the automatic vehicle stop control like this, the authority to perform an accelerator operation may be transferred (overridden) to the driver. In addition, cancellation of the execution of the automatic vehicle stop control may be made by an accelerator operation.

In the present embodiment, the emergency vehicle stop switch 12 is provided with a function of starting phone call to the outside of the vehicle. According to the present embodiment, a switch operation to cause the automatic vehicle stop control to be executed in case of an emergency, and a switch operation to start phone call to the outside of the vehicle in case of an emergency may be performed by a single operation. Thus, the load of an occupant on a switch operation is reduced.

2. Second Embodiment

In the first embodiment, when the emergency vehicle stop switch 12 is operated and an accelerator non-operation state lasting for the accelerator non-operation time threshold value Tnth1 or longer is detected, automatic vehicle stop control is executed. In the second embodiment, when the emergency vehicle stop switch 12 is operated and an accelerator operation state and a brake operation state are detected at the same time, automatic vehicle stop control is executed. In the case of the second embodiment, the same device configuration as in the first embodiment may be utilized. However, the program for the emergency vehicle controller 30 has to be changed.

In the present embodiment, the automatic vehicle stop determiner 32 may determine whether or not both an accelerator operation state detected by the accelerator operation detector 14, and a brake operation state detected by the brake operation detector 16 occur at the same time. Specifically, this processing may be performed instead of step S13 to step S17 illustrated in FIG. 3 and step S36 to step S40 illustrated in FIG. 4. The second embodiment may be practiced independently or may be practiced concurrently with the first embodiment.

As described above, the emergency vehicle control device 10 according to the second embodiment includes the emergency vehicle stop switch 12 (emergency situation detector) that detects or estimates an emergency situation, the accelerator operation detector 14 that detects whether or not the accelerator is being operated, and the brake operation detector 16 that detects whether or not at least one of the parking brake lever and the brake pedal is being operated. When an emergency situation is detected or estimated by the emergency vehicle stop switch 12 (emergency situation detector) and an accelerator operation state and a brake operation state are detected at the same time by the accelerator operation detector 14 and the brake operation detector 16 while the vehicle is running, the vehicle is automatically stopped. In the embodiment, simultaneous timing of detection of an accelerator operation and a brake operation is not one of the conditions for automatic vehicle stop. Detection of both an accelerator operation and a brake operation is one of the conditions for automatic vehicle stop regardless of the timing of operation start of one of both operations being before or after the timing of operation start of the other operation.

According to the second embodiment, as one of methods for estimating a state that makes it difficult for the driver to continue driving, a signal of simultaneous operation state of an accelerator and a brake is utilized which occurs and is easily detected when illness of the driver occurs. The combination of detection of the signal and detection of another emergency situation, for instance, a switch operation performed by a passenger enables easy and accurate estimation of the driver's state that makes it difficult to continue driving, and allows automatic vehicle stop control to be executed.

3. Other Embodiments

In the first and second embodiments, an occurrence of an emergency situation is detected by an operation of the emergency vehicle stop switch 12 performed by an occupant. However, any method may be used as long as the driver's state making it difficult to continue driving is detectable by the method. For instance, the face of the driver may be captured and closing of the eyelids of the driver may be determined. Also, whether the driver has lost his/her posture may be determined. Also, the voice (sound volume and sound frequencies) of the occupants in the vehicle may be determined.

Also, the emergency vehicle stop switch 12 is a device via which an occupant commands the emergency vehicle controller 30 to execute or cancel execution of the automatic vehicle stop control. The emergency vehicle stop switch 12 is also a device that commands start of communication with an emergency lifesaving center. That is, the emergency vehicle stop switch 12 is provided with a function of indicating an intention of an occupant regarding execution and cancellation of execution of automatic vehicle stop control of a vehicle while running. In addition, the emergency vehicle stop switch 12 is provided with a function of starting phone call to the outside of the vehicle. The emergency vehicle stop switch 12 may not be provided with a function of starting phone call to the outside of the vehicle, and may be provided with other functions.

What is claimed is:

1. A vehicle comprising:
an emergency vehicle controller configured to perform an automatic vehicle stop control of the vehicle which is running so as to automatically step the vehicle;
an automatic return switch installed in the vehicle and operable by an occupant for determining execution and cancellation of the automatic vehicle stop control depending upon a timing and time period of operation of the switch,
wherein the emergency vehicle controller is configured to detect the timing and the time period of operation of the switch and perform the following operations based on detection results thereof:
(i) the emergency vehicle controller starts to execute the automatic vehicle stop control of the vehicle when the emergency vehicle controller detects that the switch is operated at a first timing for a first period of time and that the first period of time is a first predetermined threshold time or longer; and
(ii) the emergency vehicle controller continues the execution of the automatic vehicle stop control of the vehicle after said operation (i) when the emergency vehicle controller detects that the switch is operated at a second timing for a second period of time after said operation (i) and that an interval between the first timing and the second timing is within a second predetermined threshold time which is longer than the first predetermined threshold time, whereas the emergency vehicle controller cancels the execution of the automatic vehicle stop control of the vehicle when the emergency vehicle controller detects that the interval between the first timing and the second timing exceeds the second predetermined threshold time and that the second period of time is the first predetermined threshold time or longer.

2. The vehicle according to claim 1,
wherein when the emergency vehicle controller detects that the switch is operated at a third timing for a third period of time after the cancellation of the automatic vehicle stop control and that an interval between the second timing and the third timing is within the second predetermined threshold time, the emergency vehicle controller maintains the cancellation of the automatic vehicle stop control, whereas the emergency controller device restarts the automatic vehicle stop control when the emergency vehicle controller detects that the interval between the second timing and the third timing exceeds the second predetermined threshold time and that the third period of time is the first predetermined threshold time or longer.

3. The vehicle according to claim 1, further comprising
a vehicle operation detector that detects a predetermined vehicle operation,
wherein the emergency vehicle controller performs the automatic vehicle stop control, thereby automatically stopping the vehicle, in a case where the following conditions are met: (a) it is determined that the execution of the automatic vehicle stop control starts by the operation of the switch during running of the vehicle; and (b) the predetermined vehicle operation is detected by the vehicle operation detector.

4. The vehicle according to claim 1, further comprising:
a vehicle operation detector that detects an accelerator operation by a driver of the vehicle,
wherein when the accelerator operation is detected during execution of the automatic vehicle stop control, the emergency vehicle controller temporarily stops the automatic vehicle stop control and allows the accelerator operation to be preferentially performed, and then, when the accelerator operation is continuously detected for a predetermined time or longer, the emergency vehicle controller cancels the execution of the automatic vehicle stop control.

5. The vehicle according to claim 1,
wherein the switch is provided with an additional function other than said function of determining the execution and cancellation of the automatic vehicle stop control.

6. The vehicle according to claim 5,
wherein the additional function of the switch comprises starting phone call to an outside of the vehicle when the switch is operated.

* * * * *